(12) United States Patent
Kobayashi et al.

(10) Patent No.: US 8,957,166 B2
(45) Date of Patent: Feb. 17, 2015

(54) METHOD FOR PRODUCING PROPYLENE-BASED POLYMER

(75) Inventors: Yoshitaka Kobayashi, Ichihara (JP); Takanori Nakashima, Ichihara (JP); Kiyoshi Yukawa, Ichihara (JP); Yusuke Yamada, Ichihara (JP); Hajime Aoyama, Ichihara (JP); Nobuhiro Iwai, Ichihara (JP)

(73) Assignee: Japan Polypropylene Corporation, Tokyo (JP)

( * ) Notice: Subject to any disclaimer, the term of this patent is extended or adjusted under 35 U.S.C. 154(b) by 374 days.

(21) Appl. No.: 13/505,109

(22) PCT Filed: Oct. 29, 2010

(86) PCT No.: PCT/JP2010/069381
§ 371 (c)(1),
(2), (4) Date: Jun. 22, 2012

(87) PCT Pub. No.: WO2011/052757
PCT Pub. Date: May 5, 2011

(65) Prior Publication Data
US 2012/0302716 A1    Nov. 29, 2012

(30) Foreign Application Priority Data

Oct. 29, 2009  (JP) ................. 2009-249568
Dec. 27, 2009  (JP) ................. 2009-296556
Dec. 31, 2009  (JP) ................. 2009-299307

(51) Int. Cl.
*C08F 2/00* (2006.01)
*C08F 210/00* (2006.01)
(Continued)

(52) U.S. Cl.
CPC ............... *C08F 10/06* (2013.01); *B01J 8/226* (2013.01); *B01J 8/228* (2013.01); *C08F 110/06* (2013.01);
(Continued)

(58) Field of Classification Search
CPC ............. C08F 10/06; C08F 2/34; C08F 2/01; C08F 210/06; C08F 110/06; C08F 210/16; C08F 2500/12; C08F 2500/24; B01J 8/228; B01J 2219/182; B01J 2219/0022; B01J 2219/00202; B01J 2219/00198; B01J 2208/00283; B01J 2208/00274
USPC ............................ 422/134; 526/65, 348, 351
See application file for complete search history.

(56) References Cited

U.S. PATENT DOCUMENTS 3,971,768 A    7/1976   Peters et al.
4,921,919 A    5/1990   Lin et al.
(Continued)

FOREIGN PATENT DOCUMENTS

CN    1081683 A        2/1994
CN    1590416 A    *   3/2005
(Continued)

OTHER PUBLICATIONS

International Search Report issued on Feb. 22, 2011 in PCT/JP10/69381 filed on Oct. 29, 2010.
(Continued)

*Primary Examiner* — William Cheung
(74) *Attorney, Agent, or Firm* — Oblon, Spivak, McClelland, Maier & Neustadt, L.L.P.

(57) ABSTRACT

A method for producing a propylene-based polymer, including polymerizing propylene or propylene and an α-olefin except propylene in the presence of a catalyst with a horizontal polymerization reactor equipped with stirring vanes rotating around a horizontal axis therein by a continuous vapor-phase polymerization, which removes heat of polymerization by heat of vaporization of a liquefied propylene, wherein the reactor can set a plurality of area sections different in temperature in a horizontal direction inside the reactor, and satisfies at least one of i) a temperature difference, $\Delta T1 = T\omega - T\alpha$, between an area section including an upstream end of the reactor ($T\alpha$) and a downstream end ($T\omega$) thereof is 0.1 to 20° C. and ii) a temperature difference, $\Delta T2 = Tx - Tz$, between an area section including a catalyst feed part ($Tx$) and dew point ($Tz$) of a mix gas in the reactor is 0 to 5° C.

11 Claims, 5 Drawing Sheets

(51) Int. Cl.
*C08F 110/06* (2006.01)
*B01J 19/18* (2006.01)
*C08F 10/06* (2006.01)
*B01J 8/22* (2006.01)
*C08F 210/06* (2006.01)

(52) U.S. Cl.
CPC ...... *C08F 210/06* (2013.01); *B01J 2208/00274* (2013.01); *B01J 2208/00283* (2013.01); *B01J 2219/00198* (2013.01); *B01J 2219/00202* (2013.01); *B01J 2219/0022* (2013.01); *B01J 2219/182* (2013.01)
USPC .............. 526/65; 526/348; 526/351; 422/134

(56) References Cited

U.S. PATENT DOCUMENTS

| | | |
|---|---|---|
| 5,504,166 A | 4/1996 | Buchelli et al. |
| 2009/0259006 A1 | 10/2009 | Kobayashi et al. |
| 2010/0099811 A1 | 4/2010 | Kobayashi et al. |

FOREIGN PATENT DOCUMENTS

| | | |
|---|---|---|
| CN | 101379097 A | 3/2009 |
| EP | 1 197 497 A1 | 4/2002 |
| EP | 1 980 576 A1 | 10/2008 |
| JP | 63 199203 | 8/1988 |
| JP | 7 504708 | 5/1995 |
| JP | 7 94485 | 10/1995 |
| JP | 11 209415 | 8/1999 |
| JP | 2000 264918 | 9/2000 |
| JP | 3180305 | 6/2001 |
| JP | 2007-231257 A | 9/2007 |
| JP | 2008-115321 | 5/2008 |
| JP | 2008-120842 | 5/2008 |
| JP | 2009-073890 | 4/2009 |
| WO | 00 42081 | 7/2000 |
| WO | 2007 088887 | 8/2007 |

OTHER PUBLICATIONS

Extended European Search Report issued Feb. 11, 2013, in European Patent Application No. 10826887.1.
Combined Chinese Office Action and Search Report issued Apr. 17, 2013 in Patent Application No. 201080049589.4 with English Translation and English Translation of Category of Cited Documents.

* cited by examiner

METHOD FOR PRODUCING PROPYLENE-BASED POLYMER

This patent application is a U.S. national stage entry under 35 U.S.C. Section 371 of International Patent Application No. PCT/JP10/69381 filed on Oct. 29, 2010, which claims the benefit of foreign priority to Japanese Patent Application No. JP 2009-249568 filed on Oct. 29, 2009, Japanese Patent Application No. JP 2009-296556 filed on Dec. 27, 2009, and Japanese Patent Application No. JP 2009-299307 filed on Dec. 31, 2009, the disclosures of all of which are hereby incorporated by reference in their entireties.

TECHNICAL FIELD

The present invention relates to a method for producing a propylene-based polymer. More specifically, it relates to a polymerization method capable of stably producing a propylene-based polymer in a good production efficiency with sufficiently inhibiting formation of aggregated and fine powder polymers in a vapor-phase polymerization of propylene using a horizontal polymerization reactor by controlling temperatures in the reactor through specific heat removal.

BACKGROUND ART

Since propylene-based polymers have excellent mechanical properties such as rigidity and heat resistance and a good moldability, can be produced at relatively low costs, and exhibit a high adaptability to environmental problems, the polymers have been industrially applied to wide uses.

Therefore, the production process of polypropylene has been technically investigated continuously from the viewpoints of simplifying its steps, reducing production costs, improving productivity, and further improving catalyst performance.

In the production process of polypropylene, at the beginning of industrial production of polypropylene, catalyst performance was low and thus a step for removing a catalyst residue, atactic polymer, and the like was necessary, so that processes such as a slurry process using a solvent were mainly employed.

Thereafter, with remarkable advance in catalyst performance, the necessity of removing the catalyst residue, atactic polymer, and the like has been reduced. Currently, a vapor-phase process is a mainstream.

In the vapor-phase process, recently, highly activated type catalysts including supported catalysts as representatives have been commonly used. However, application of novel catalysts, such as highly activated catalysts and metallocene catalysts developed in recent progress in the catalyst technology, to the process and inhibition of generation of an aggregated polymer and reduction of formation of fine powder become problems to be solved also from the viewpoint of stable operation of the process.

For preventing the generation of the aggregated amorphous polymers in the vapor-phase polymerization, removal of heat of polymerization is relatively difficult in a catalyst feed part in a fluidized bed reactor, so that temperature in the fluidized bed is prone to be unstable by local accumulation of the heat of polymerization. Therefore, there has been proposed a production method of polypropylene wherein temperature and pressure in a vapor-phase polymerization reactor are controlled by a liquid flow rate of a liquefied circulating gas returning to the reactor, a flow rate of a discharging gas to the outside of the system, and a flow rate of a feeding monomer gas utilizing heat of vaporization using a fluidized bed reactor (see e.g., Patent Document 4). However, there is unavoidably a room for improvement in view of the removal of the heat of polymerization in the fluidized bed reactor at the time of increase in production and rapid grade change.

Moreover, for the purpose of inhibiting the formation of the aggregated polymer and retaining a fluidized state, there has been proposed a vapor-phase polymerization method characterized in that an inner wall temperature of a reactor is cooled to the dew point of a fluidizing gas or lower at polymerization in a fluidized bed reactor (see, e.g., Patent Document 5). However, the present inventors have recognized that difficulty is involved in operation control because of local phase change.

On the other hand, as a vapor-phase process, there is known a polymerization process using a horizontal polymerization reactor equipped with stirring vanes rotating around a horizontal axis as a vapor-phase reactor of an olefin in which heat of polymerization is removed utilizing heat of vaporization of liquefied propylene. The method for removing the heat of polymerization utilizing heat of vaporization of liquefied propylene has an advantage in view that a large heat-removing ability can be realized by a small facility.

Moreover, polymer particles polymerized in the horizontal polymerization reactor are formed in a reactor, transferred and advanced along the reactor by stirring with the progress of polymerization, so that there is exhibited a piston flow type that is a flow pattern in the case where several pieces of continuous stirred tank reactor are serially aligned. The horizontal polymerization reactor is economically advantageous in view that a solid mixing degree equal to the degree in the case of two or three or more reactors can be easily achieved with regard to a ratio of length to diameter.

Furthermore, since the polymerization reactor is a horizontal type, the reactor is advantageous in view of efficient removal of the heat of polymerization at heat removal as compared with a vertical reactor. A technique of removing the heat of polymerization utilizing the heat of vaporization of liquefied propylene and using a horizontal polymerization reactor equipped with a stirring vanes rotating around a horizontal axis has excellent characteristics as mentioned above (see, e.g., Patent Document 1).

Upon precise investigation on the process using the horizontal polymerization reactor, the present inventors have grasped the following problems caused by the generation of the aggregated and fine powder polymer.

In general, in the horizontal polymerization reactor, a catalyst is fed from the upstream end of the reactor to the inside of the reactor and propylene powder is formed in the reactor and is extracted from a downstream thereof. In the process where the heat of vaporization of liquefied propylene is utilized for removing the heat of polymerization, since a large amount of a vaporized gas is generated, it is desirable for the polymer particles to make a particulate shape as rapid as possible at an upstream part in order to avoid entrainment of fine powder with the vaporized gas to attach the powder to pipes and filters in a gas discharge pipe system or occlude them. On the other hand, acceleration of the reaction may cause generation of the aggregated amorphous polymers owing to local heat generation induced by the rapid reaction and may cause discontinuation of the production process.

In the case where the heat of vaporization of liquefied propylene is utilized, it is a common method that a gas is extracted from the reactor, the gas is cooled by a heat exchanger to liquefy it, and the liquefied gas is returned to the reactor. Since temperature at which gas is liquefied (dew point) depends on pressure and gas composition, when a gas component having a low dew point, such as hydrogen or ethylene, is mixed into propylene, the dew point is lowered as a mixing amount increases. Cooling ability of a heat exchanger is determined by a facility and, in the case where the same facility is used, an ability to liquefy a gas decreases, i.e., heat-removing ability decreases as the dew point of the gas component lowers.

Thus, in the production process where hydrogen or ethylene is present in the reactor in a large amount, such as a propylene-based polymer having a high MFR or a random polymer using a novel catalyst such as a highly activated catalyst or a metallocene catalyst, catalyst activity is enhanced but the generation of the aggregated polymer owing to the decrease in heat-removing ability is unavoidable. Moreover, since a high polymerization activity is exhibited, problems such as deterioration of the particle shape, formation of fine powder, and degradation of powder properties arise, so that there are problems in the application to the polymerization process.

As above, in the case where a novel catalyst such as a highly activated catalyst or a metallocene catalyst is applied to a vapor-phase polymerization for producing polypropylene, there are problems to be solved in view of inhibition of the aggregated amorphous polymers or fine powder and productivity.

In order to cope with such problems, there has been proposed a method for inhibiting a polymer aggregate by separating a feed port for a titanium-supported catalyst component from a feed port for a co-catalyst component in a horizontal polymerization reactor (see, e.g., Patent Document 2). Moreover, there has been also proposed a method for inhibiting aggregated amorphous polymers by a pre-polymerization treatment with an α-olefin and donor addition (see, e.g., Patent Document 3).

Furthermore, there has been proposed a method for producing an α-olefin polymer wherein temperature of the reactor becomes homogeneous and the generation of the aggregated amorphous polymers is prevented by performing operation at a pressure and temperature in a reaction zone within a certain pressure range under dew point curve in a pressure-temperature diagram, in a substantially vertical stirring bed reactor (see, e.g., Patent Document 6).

In the problem of the generation of fine powder, in the process utilizing the heat of vaporization of liquefied propylene, there has been mentioned a problem that the gas flow rate in the gas discharge pipe system is large due to the generation of a large amount of a vaporized gas, fine powder and fine particles of the polymer particles are entrained with the vaporized gas (entrainment phenomenon), to attach to or occlude the pipes and filters of the gas discharge pipe system. When the attachment and occlusion become excessive, it becomes unavoidable to stop the production process and perform cleaning. In order to avoid such a problem, there has been proposed a method of diminishing the amount of the fine powder by a method of providing a separating chamber through which an unreacted gas and cooled steam discharged from an upper part of a horizontal polymerization reactor are allowed to pass and spraying a liquid coolant into the separating chamber (see, e.g., Patent Document 7).

BACKGROUND ART DOCUMENTS

Patent Documents

Patent Document 1: U.S. Pat. No. 3,971,768
Patent Document 2: JP-B-7-94485
Patent Document 3: WO00/42081
Patent Document 4: JP-A-11-209415
Patent Document 5: Japanese Patent No. 3,180,305
Patent Document 6: JP-A-2000-264918
Patent Document 7: JP-A-63-199203

SUMMARY OF THE INVENTION

Problems that the Invention is to Solve

However, by the method disclosed in Patent Document 2, inhibition of the aggregate and production efficiency have not sufficiently satisfied.

Moreover, the method disclosed in Patent Document 3 includes problems of decreasing catalyst performance owing to the donor compound addition.

On the other hand, in the production method disclosed in Patent Document 6, a problem that a sufficient catalyst activity is not obtained since the reaction pressure or temperature is limited.

Furthermore, in the method disclosed in Patent Document 7, an amount of the vaporized gas increases in the case where the production rate is increased and, in an extreme case, there arises a defect that the fine powder cannot be separated unless the diameter of the separating chamber is almost equal to the diameter of the reactor or an incidental facility should be further added.

As precisely mentioned as background art in the above, in the conventional art, technologies on the performance of the horizontal polymerization reactor, properties of the polymer particles, and the like have been improved but there has not been realized a technology satisfying all the problems such as inhibition of the aggregated amorphous polymers and fine powder and improvement in production efficiency and thus further technical improvement has been desired from such a viewpoint.

In consideration of the situation of the background art as mentioned above, for the application of a novel catalyst such as a highly activated catalyst or a metallocene catalyst to the vapor-phase polymerization process, it is a problem to be solved by the invention to develop a method for stably producing a propylene-based polymer together with inhibiting the generation of a aggregated polymer, reducing a formation amount of fine powder, and thereby enhancing production efficiency in a process for producing a propylene-based polymer, comprising polymerizing propylene or propylene and an α-olefin including ethylene using a horizontal polymerization reactor equipped with a stirring vanes rotating around a horizontal axis in the inside of the reactor by a continuous vapor-phase polymerization process in which heat of polymerization is removed by heat of vaporization of liquefied propylene.

Means for Solving the Problems

Aiming at solution of the above problem, for the application of a novel catalyst such as a highly activated catalyst or a metallocene catalyst to the vapor-phase polymerization process, the present inventors have searched for a method for stably producing a propylene-based polymer together with inhibiting the generation of an aggregated polymer, reducing a formation amount of fine powder, and thereby enhancing production efficiency, by variously considering and investigating a method for removing heat of polymerization, a control of the heat of polymerization and polymerization conditions, a structure of the reactor, and the like and verifying them through experiments, in a process for producing a propylene-based polymer, comprising polymerizing propylene or propylene and an α-olefin including ethylene using a horizontal polymerization reactor equipped with stirring vanes rotating around a horizontal axis in the inside of the reactor by a continuous vapor-phase polymerization process in which heat of polymerization is removed by heat of vaporization of liquefied propylene.

As a result of the processes, the above problem can be solved when temperature conditions in the polymerization reactor are specifically set and controlled at the removal of the heat of polymerization utilizing the heat of vaporization of liquefied propylene and thus there have been found a technique for stably producing a propylene-based polymer together with inhibiting the generation of an aggregated polymer, reducing a formation amount of fine powder, and thereby enhancing production efficiency in extremely remarkable degrees. Thus, the inventors have created the invention.

The invention solves the above problem though providing temperature gradation by setting temperature at a downstream end high as compared with temperature at an upstream end, controlling temperature every area in the reactor, and further controlling temperature at the catalyst feed part relative to dew point of mix gas in the reactor, as fundamental requirements.

Thus, for the application of a novel catalyst such as a highly activated catalyst or a metallocene catalyst to the vapor-phase polymerization process, the invention makes it possible to produce a propylene-based polymer stably together with inhibiting the generation of an aggregated polymer, reducing a formation amount of fine powder, and thereby enhancing production efficiency, in a process for producing a propylene-based polymer, comprising polymerizing propylene or propylene and an α-olefin including ethylene using a horizontal polymerization reactor equipped with stirring vanes rotating around a horizontal axis in the inside of the reactor by a continuous vapor-phase polymerization process in which heat of polymerization is removed by heat of vaporization of liquefied propylene. Such actions and effects are verified by data of Examples and comparison between Examples and Comparative Examples.

In the above, the circumstances of creating the invention and fundamental constituting elements and characteristics of the invention are schematically described. Here, when the whole of the invention is surveyed, the invention is composed of the following unit groups of the invention. Incidentally, the whole of the invention groups are collectively called "the (present) invention".

<1>

A method for producing a propylene-based polymer, comprising polymerizing propylene or propylene and an α-olefin except propylene in the presence of a catalyst using a horizontal polymerization reactor equipped with stirring vanes rotating around a horizontal axis in the inside of the reactor by a continuous vapor-phase polymerization method in which heat of polymerization is removed by heat of vaporization of liquefied propylene, wherein the reactor can set a plurality of area sections different in temperature in a horizontal axis direction in the inside of the reactor and at least one of the following requirements (A) and (B) is satisfied:

requirement (A): temperature difference $\Delta T1$ (° C.) (=$T\omega$−$T\alpha$) between temperature ($T\alpha$) of an area section including an upstream end of the reactor and temperature ($T\omega$) of an area section including a downstream end thereof is 0.1 to 20° C.;

requirement (B): temperature difference $\Delta T2$ (° C.) (=$Tx$−$Tz$) between temperature ($Tx$) of an area section including a catalyst feed part and dew point ($Tz$) of mix gas in the reactor is 0 to 5° C.

<2>

A method for producing a propylene-based polymer, comprising polymerizing propylene or propylene and an α-olefin except propylene in the presence of a catalyst using a horizontal polymerization reactor equipped with stirring vanes rotating around a horizontal axis in the inside of the reactor by a continuous vapor-phase polymerization method in which heat of polymerization is removed by heat of vaporization of liquefied propylene, wherein the reactor can set a plurality of area sections different in temperature in a horizontal axis direction in the inside of the reactor and at least one of the following requirements (C) and (D) is satisfied:

requirement (C): temperature difference $\Delta T1$ (° C.) (=$T\omega$−$T\alpha$) between temperature ($T\alpha$) of an area section including an upstream end of the reactor and temperature ($T\omega$) of an area section including a downstream end thereof is 0.1 to 20° C. and temperature difference $\Delta T2$ (° C.) (=$Tx$−$Tz$) between temperature ($Tx$) of an area section including a catalyst feed part and dew point ($Tz$) of mix gas in the reactor is 1 to 20° C.;

requirement (D): temperature difference $\Delta T1$ (° C.) (=$T\omega$−$T\alpha$) between temperature ($T\alpha$) of an area section including an upstream end of the reactor and temperature ($T\omega$) of an area section including a downstream end thereof is 2 to 15° C. and temperature difference $\Delta T2$ (° C.) (=$Tx$−$Tz$) between temperature ($Tx$) of an area section including a catalyst feed part and dew point ($Tz$) of mix gas in the reactor is 0 to 5° C.

<3>

The method for producing a propylene-based polymer according to above <1> or <2>, wherein reaction temperature $Tn$ of n-th area section (n) from the upstream end to the downstream side and reaction temperature $Tn+1$ of an area section (n+1) adjacent to the area section (n) on the downstream side has a relation of $Tn \leq Tn+1$ and n is an integer of 1 or more.

<4>

The method for producing a propylene-based polymer according to any one of above <1> to <3>, wherein the reaction temperatures $Tn$ of a plurality of the area sections (n) are individually controlled at different temperatures.

<5>

The method for producing a propylene-based polymer according to any one of above <1> to <4>, wherein the catalyst feed part is included in the area section including the upstream end of the reactor.

<6>

The method for producing a propylene-based polymer according to any one of above <1> to <4>, wherein the catalyst feed part is placed in an area at a distance of 2.5 to 10% of a length of the reactor on the downstream side from the upstream end of the reactor.

<7>

The method for producing a propylene-based polymer according to any one of above <1> to <6>, wherein at least a half of the heat of polymerization is removed using the heat of vaporization of liquefied propylene.

<8>

The method for producing a propylene-based polymer according to any one of above <1> to <7>, wherein the catalyst is a Ziegler polymerization catalyst or a metallocene polymerization catalyst.

<9>

The method for producing a propylene-based polymer according to any one of above <1> to <7>, wherein the catalyst is a polymerization catalyst in which a metallocene compound is supported on a support.

<10>

The method for producing a propylene-based polymer according to above <9>, wherein particle shape and particle size of the metallocene polymerization catalyst are controlled.

<11>

The method for producing a propylene-based polymer according to above <9> or <10>, wherein melting peak temperature Tm of the propylene-based polymer to be produced is 105 to 140° C. on differential scanning calorimetry (DSC).

Advantage of the Invention

For the application of a novel catalyst such as a highly activated catalyst or a metallocene catalyst to the vapor-phase polymerization process, the invention makes it possible to produce a propylene-based polymer stably together with inhibiting the generation of an aggregated polymer, reducing a formation amount of fine powder, and thereby enhancing production efficiency, in a process for producing a propylene-based polymer, comprising polymerizing propylene or propylene and an α-olefin including ethylene using a horizontal polymerization reactor equipped with stirring vanes rotating around a horizontal axis in the inside of the reactor by a continuous vapor-phase polymerization process in which heat of polymerization is removed by heat of vaporization of liquefied propylene.

MODE FOR CARRYING OUT THE INVENTION

Figure 1:
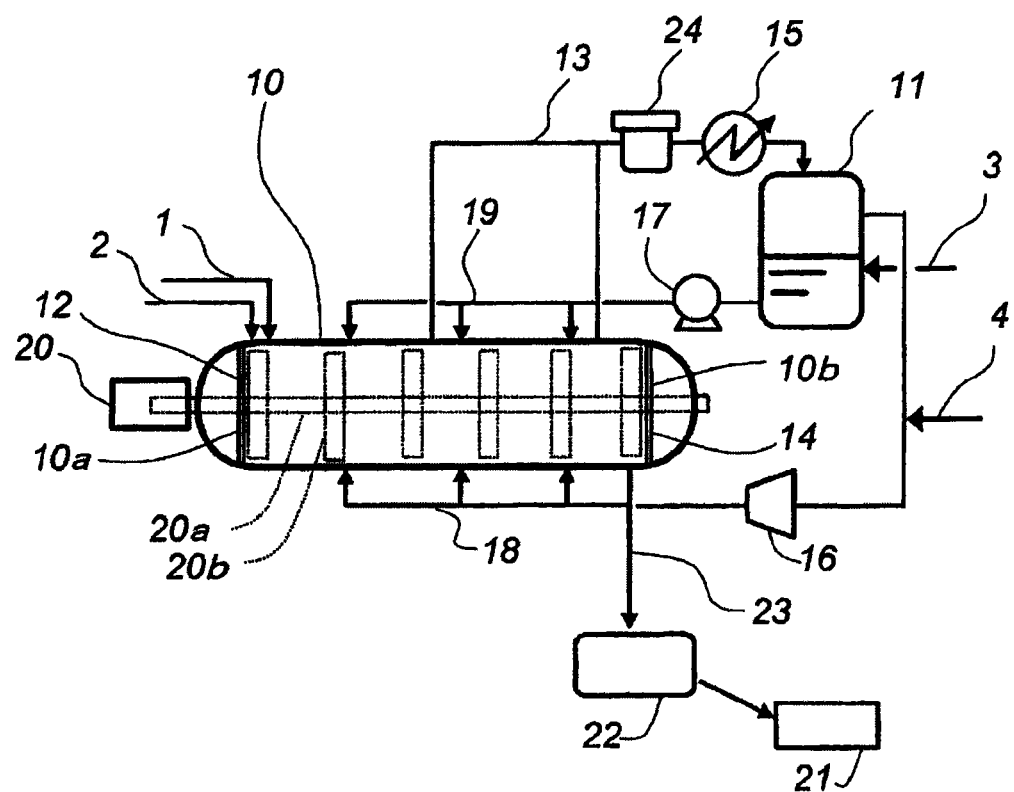
FIG. 1 is an explanatory drawing of the horizontal polymerization reactor to be used in the production method of the invention.

The following will specifically and precisely describe catalysts used in the invention, production processes in the invention and conditions thereof, and methods for producing a propylene-based polymer by the invention, in modes for carrying out the invention.

In the present Description, "% by mass" and "part(s) by mass" are the same as "% by weight" and "part(s) by weight", respectively.

1. Regarding Propylene-Based Polymer in the Invention

The propylene-based polymer to be produced in the invention includes [i] a propylene homopolymer, [ii] a random copolymer containing propylene and one or more α-olefins and [iii] a block copolymer, and [iv] a propylene-based polymer containing an olefin polymer component supported in a catalyst for olefin polymerization, which is obtained via a pre-polymerization step where a small amount of an olefin is brought into contact with a catalyst for olefin polymerization, and the above [i], [ii] or [iii] polymerized using the pre-polymerization catalyst as a main component for the catalyst for propylene production. In the following, a description of "propylene-based polymer" is used as such a meaning.

The "α-olefin" to be polymerized with propylene in the invention is not particularly limited but an olefin having 2 to 12 carbon atoms except propylene, particularly an α-olefin having 2 to 12 carbon atoms is preferably used. Specifically, there may be mentioned ethylene, 1-butene, 1-pentene, 1-hexene, 1-octene, 1-decene, 4-methyl-1-pentene, 3-methyl-1-pentene, and the like. Particularly, ethylene, 1-butene, or 4-methyl-1-pentene is preferably used. It is also possible to use not only one kind but also two or more kinds of these α-olefins. Incidentally, the α-olefin except propylene to be polymerized in the invention is also described as "other α-olefin" in the description.

2. Catalyst for Olefin Polymerization to be Used in the Invention

As the catalyst for olefin polymerization to be used in the invention, there may be mentioned (I) a catalyst for polymerization composed of 1. a solid catalyst component containing titanium, magnesium, halogen, and an electron-donating compound as an internal donor as essential components, 2. an organoaluminum compound, and, if necessary, 3. an external donor, i.e., Ziegler polymerization catalyst.

Moreover, it is also possible to use (II) a catalyst for polymerization composed of A. a metallocene complex comprising a transition metal compound, B. a catalyst component containing a co-catalyst activating the complex as an essential component, and, if necessary, C. an organoaluminum compound, i.e., a metallocene polymerization catalyst. Here, the phrase "containing . . . as an essential component" shows that elements other than the component may be contained, these elements may be individually present as arbitrary compounds, and these elements may be present as one where they are mutually bonded.

The catalyst for olefin polymerization usable in the invention is preferably the aforementioned Ziegler catalyst or metallocene catalyst but is not limited thereto.

(I) Ziegler Catalyst (1) Titanium, Magnesium, Halogen, and Electron-Donating Compound As the solid catalyst component itself containing titanium, magnesium, and halogen, known one can be used. For example, use are made of those described in JP-A-53-45688, JP-A-54-3894, JP-A-54-131589, JP-A-55-75411, JP-A-55-155003, JP-A-56-18609, JP-A-56-155206, JP-A-57-3803, JP-A-57-121003, JP-A-58-5309, JP-A-58-183709, JP-A-63-108008, JP-A-63-264608, JP-A-1-79203, JP-A-1-98603, JP-A-7-258328, JP-A-8-269125, JP-A-11-21309, and the like.

As the magnesium compound to be a magnesium source for use in the invention, there may be mentioned metal magnesium, magnesium dihalides, dialkoxymagnesiums, dialkoxymagnesium dihalides, magnesium oxyhalides, dialkylmagnesiums, alkylmagnesium halides, magnesium oxide, magnesium hydroxide, carboxylate salts of magnesium, and the like. Of these, magnesium compounds represented by $Mg(OR)_{2-m}X_m$ (where R is a hydrocarbon group, preferably one having 1 to about 10 carbon atoms, X represents a halogen, and m is $0 \leq m \leq 2$) such as magnesium dihalides and dialkoxymagnesiums are preferred.

As the titanium compound to be a titanium source, there may be mentioned compounds represented by $Ti(OR)_{4-n}X_n$ (where R is a hydrocarbon group, preferably one having 1 to about 10 carbon atoms, X represents a halogen, and n is $0 \leq m \leq 4$).

Specific examples include $TiCl_4$, $TiBr_4$, $TiI_4$, $Ti(OC_2H_5)Cl_3$, $Ti(OC_2H_5)_2Cl_2$, $Ti(OC_2H_5)_3Cl$, $Ti(O-i-C_3H_7)Cl_3$, $Ti(O-n-C_4H_9)Cl_3$, $Ti(O-n-C_4H_9)_2Cl_2$, $Ti(OC_2H_5)Br_3$, $Ti(OC_2H_5)(O-n-C_4H_9)_2Cl$, $Ti(O-n-C_4H_9)_3Cl$, $Ti(OC_6H_5)Cl_3$, $Ti(O-i-C_4H_9)_2Cl_2$, $Ti(OC_5H_{11})Cl_3$, $Ti(OC_6H_{13})Cl_3$, $Ti(OC_2H_5)_4$, $Ti(O-n-C_3H_7)_4$, $Ti(O-n-C_4H_9)_4$, $Ti(O-i-C_4H_9)_4$, $Ti(O-n-C_6H_{13})_4$, $Ti(O-n-C_8H_{17})_4$, $Ti(OCH_2(C_2H_5)C_4H_9)_4$, and the like.

Moreover, a titanium compound obtained by reacting $TiX'_4$ (where X' is halogen) with an electron-donating compound to be mentioned below can be also used as a titanium source.

Specific examples of such a molecular compound include $TiCl_4 \cdot CH_3COC_2H_5$, $TiCl_4 \cdot CH_3CO_2C_2H_5$, $TiCl_4 \cdot C_6H_5NO_2$, $TiCl_4 \cdot CH_3COCl$, $TiCl_4 \cdot C_6H_5COCl$, $TiCl_4 \cdot C_6H_5CO_2C_2H_5$, $TiCl_4 \cdot ClCOC_2H_5$, $TiCl_4 \cdot C_4H_4O$, and the like.

Moreover, it is also possible to use a titanium compound such as $TiCl_3$ (including one obtained by reducing $TiCl_4$ with hydrogen, one obtained by reducing it with aluminum metal, one obtained by reducing it with an organometallic compound, and the like), $TiBr_3$, $Ti(OC_2H_5)Cl_2$, $TiCl_2$, dicyclopentadienyltitanium dichloride, cyclopentadienyltitanium trichloride, or the like.

Of these titanium compounds, $TiCl_4$, $Ti(OC_4H_9)_4$, $Ti(OC_2H_5)Cl_3$, and the like are preferred.

The halogen is usually added from aforementioned halogenated compounds of magnesium and/or halogenated compounds of titanium but can be also added from other halogen sources, for example, known halogenating agents including halogenated compounds of aluminum such as $AlCl_3$, $AlBr_3$, and $AlI_3$, halogenated compounds of boron such as $BCl_3$, $BBr_3$, and $BI_3$, halogenated compounds of silicon such as $SiCl_4$, halogenated compounds of phosphorus such as $PCl_3$ and $PCl_5$, halogenated compounds of tungsten such as $WCl_6$, halogenated compounds of molybdenum such as $MoCl_5$, and the like. The halogen contained in the solid catalyst component may be fluorine, chlorine, bromine, iodine, or a mixture thereof and chlorine is particularly preferred.

As the electron-donating compound (internal donor), there may be exemplified oxygen-containing electron donors such as alcohols, phenols, ketones, aldehydes, carboxylic acids, esters of organic acids or inorganic acids, ethers, acid amides, and acid anhydrides, nitrogen-containing electron donors such as ammonia, amines, nitriles, and isocyanates, sulfur-containing electron donors such as sulfonic acid esters, and the like.

More specifically, there may be mentioned (a) alcohols having 1 to 18 carbon atoms such as methanol, ethanol, propanol, butanol, pentanol, hexanol, octanol, dodecanol, octadecyl alcohol, benzyl alcohol, phenylethyl alcohol, and isopropylbenzylalcohol, (b) phenols having 6 to 25 carbon atoms, which may have an alkyl group, such as phenol, cresol, xylenol, ethylphenol, propylphenol, isopropylphenol, nonylphenol, and naphthol, (c) ketones having 3 to 15 carbon atoms such as acetone, methyl ethyl ketone, methyl isobutyl ketone, acetophenone, and benzophenone, (d) aldehyde having 2 to 15 carbon atoms such as acetaldehyde, propionaldehyde, octylaldehyde, benzaldehyde, tolualdehyde, and naphthoaldehyde, (e) organic acid esters having 2 to 20 carbon atoms including organic acid monoesters such as methyl formate, methyl acetate, ethyl acetate, vinyl acetate, propyl acetate, octyl acetate, cyclohexyl acetate, cellosolve acetate, ethyl propionate, methyl butyrate, methyl benzoate, ethyl benzoate, propyl benzoate, butyl benzoate, octyl benzoate, cyclohexyl benzoate, γ-butyrolactone, α-valerolactone, and coumarin, or organic acid polyvalent esters such as diethyl phthalate, dibutyl phthalate, dihexyl phthalate, diethyl succinate, dibutyl maleate, diethyl 1,2-cyclohexanecarboxylate, and α-olefin carbonate, (f) inorganic acid esters like silicate esters such as ethyl silicate and butyl silicate, (g) acid halides having 2 to 15 carbon atoms such as acetyl chloride, benzoyl chloride, toluoyl chloride, anisoyl chloride, phthaloyl chloride, and isophthaloyl chloride, (h) ethers having 2 to 20 carbon atoms such as methyl ether, ethyl ether, isopropyl ether, butyl ether, amyl ether, tetrahydrofuran, anisole, diphenyl ether, 2,2-dimethyl-1,3-dimethoxypropane, 2,2-diisopropyl-1,3-dimethoxypropane, and 2,2-diisobutyl-1,3-dimethoxypropane, (i) acid amides such as acetamide, benzamide, and toluoylamide, (j) amines such as methylamine, ethylamine, diethylamine, tributylamine, piperidine, tribenzylamine, aniline, pyridine, picoline, and tetramethylethylenediamine, (k) nitriles such as acetonitrile, benzonitrile, and tolunitrile, (l) alkoxy ester compounds such as ethyl 2-(ethoxymethyl)-benzoate, ethyl 2-(t-butoxymethyl)-benzoate, ethyl 3-ethoxy-2-phenylpropionate, ethyl 3-ethoxypropionate, ethyl 3-ethoxy-2-s-butylpropionate, and ethyl 3-ethoxy-2-t-butylpropionate, (m) keto ester compounds such as ethyl 2-benzoylbenzoate, ethyl 2-(4'-methyl benzoyl)benzoate, and ethyl 2-benzoyl-4,5-dimethylbenzoate, (n) sulfonate esters such as methyl benzenesulfonate, ethyl benzenesulfonate, ethyl p-toluenesulfonate, isopropyl p-toluenesulfonate, n-butyl p-toluenesulfonate, and s-butyl p-toluenesulfonate, (o) organosilicon compounds represented by $R^1_p R^2_q Si(OR^3)_r(OR^4)_{4-p-q-r}$ (where $R^1$ and $R^2$ may be the same or different and are each a branched, cyclic, or linear hydrocarbon group having 1 to 20 carbon atoms, $R^3$ is a hydrocarbon group having 1 to 10 carbon atoms, $R^4$ is a hydrocarbon group having 1 to 4 carbon atoms, and p, q, and r are each as follows: $1 \leq p \leq 2$, $0 \leq q \leq 1$, $0 \leq r \leq 2$, and $p+q+r \leq 3$), and the like.

(2) Organoaluminum Compound

As the organoaluminum compound, use can be made of compounds disclosed in JP-A-2004-124090, and the like.

Specific examples include those represented by $R^1_{3-s}AlX_s$ or $R^2_{3-t}Al(OR^3)_t$ (where $R^1$ and $R^2$ are each a hydrocarbon group having 1 to 20 carbon atoms or a hydrogen atom, $R^3$ is a hydrocarbon group, X is halogen, and s and t are each $0 \leq s < 3$, $0 < t < 3$).

Specifically, there may be mentioned (a) trialkylaluminums such as trimethylaluminum, triethylaluminum, triisobutylaluminum, tri-n-hexylaluminum, tri-n-octylaluminum, and tri-n-decylaluminum, (b) alkylaluminum halides such as diethylaluminum monochloride, diisobutylaluminum monochloride, ethylaluminum sesquichloride, and ethylaluminum dichloride, (c) alkylaluminum hydrides such as diethylaluminum hydride and diisobutylaluminum hydride, (d) alkylaluminum alkoxides such as diethylaluminum ethoxide and diethylaluminum phenoxide, and the like.

The organoaluminum compounds may be used as a single compound or a plurality of the compounds may be used in combination.

(3) Electron-Donating Compound (External Donor)

As a catalyst component, in addition to the above components, an electron-donating compound can be also used as an external donor according to needs.

As such an electron-donating compound, there may be mentioned compounds exemplified as the internal donors to be used as an essential component in the component (A). In the case where the electron-donating compound is used, it may be the same as or different from the compound in the component (A).

Preferable electron-donating compounds are ethers, inorganic acid esters, organic acid esters and organic acid halides, and organosilicon compounds and particularly preferred are inorganic and organic silicate esters, phthalate esters, cellosolve acetate esters, and phthaloyl halides.

Preferable silicate esters are organosilicon compounds represented by the general formula $R^1{}_v R^2{}_w Si(OR^3)_{4-v-w}$ (where $R^1$ represents a branched aliphatic hydrocarbon residue having 3 to 20 carbon atoms, preferably 3 to 10 carbon atoms or a cyclic aliphatic hydrocarbon residue having 5 to 20 carbon atoms, preferably 6 to 10 carbon atoms, $R^2$ represents a branched or linear aliphatic hydrocarbon group having 1 to 20 carbon atoms, preferably 1 to 10 carbon atoms, $R^3$ represents an aliphatic hydrocarbon group having 1 to 10 carbon atoms, preferably 1 to 4 carbon atoms, and v represents a numerical value of $0 \leq v \leq 3$ and w represents a numerical value of $0 \leq w \leq 3$ and $v+w \leq 3$). Incidentally, $R^1$ in the above general formula is preferably one branched from a carbon atom adjacent to the silicon atom.

Specifically, there may be mentioned t-Bu(Me)Si(OMe)$_2$, t-Bu(Me)Si(OEt)$_2$, t-Bu(Et)Si(OMe)$_2$, t-Bu(n-Pr)Si(OMe)$_2$, c-Hex(Me)Si(OMe)$_2$, c-Hex(Et)Si(OMe)$_2$, c-Pen$_2$Si(OMe)$_2$, i-Pr$_2$Si(OMe)$_2$, i-Bu$_2$Si(OMe)$_2$, i-Pr(i-Bu)Si(OMe)$_2$, n-Pr(Me)Si(OMe)$_2$, t-BuSi(OEt)$_3$, and also (Et$_2$N)$_2$Si(OMe)$_2$, Et$_2$N—Si(OEt)$_3$.

(II) Metallocene Polymerization Catalyst

It is not particularly limited so long as it is a metallocene polymerization catalyst. Particularly, as a metallocene polymerization catalyst to be suitably used, there may be mentioned those composed of A. a metallocene complex comprising a compound of a Group 4 or the like transition metal in the Periodic Table, the compound having conjugate five-membered ring ligands, B. a co-catalyst activating the complex, and C. an organoaluminum compound to be used according to needs.

Depending on olefin polymerization process properties, in the case where granulation is indispensable, D. a support can be further added to the above metallocene polymerization catalyst as a constituting element.

(1) Metallocene Complex

As the metallocene complex to be used in the invention, metallocene complexes of compounds of Group 4 to 6 transition metals in the Periodic Table, the compounds having conjugate five-membered ring ligands. Of these, those represented by either of the following general formulae are preferred.

[Chem 1]

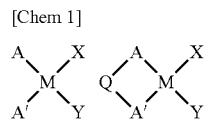

In the above general formulae, A and A' are each a cyclopentadienyl group which may have a substituent. Examples of the substituent are hydrocarbon groups (which may contain a heteroatom such as halogen, silicon, oxygen, and/or sulfur) having 1 to 30 carbon atoms. The hydrocarbon group may be bonded to a cyclopentadienyl group as a monovalent group or, in the case where a plurality of the hydrocarbon groups are present, two of them may be bonded at respective other ends (w-ends) to form a ring together with a part of the cyclopentadienyl. Examples of the ring include an indenyl group, a fluorenyl group, an azulenyl group, or the like. These groups may have further a substituent on a sub-ring. Of these, preferred is an indenyl group or an azulenyl group.

Q represents a bonding group which crosslinks between two conjugate five-membered ring ligands at an arbitrary position. Specifically, the group is preferably an alkylene group, a silylene group, a silafluorene group, or a germylene group.

M is a metal atom of a transition metal selected from Groups 4 to 6 in the Periodic Table, preferably titanium, zirconium, hafnium, or the like. Particularly, zirconium or hafnium is preferred.

X and Y are auxiliary ligands and react with the co-catalyst to form an active metallocene having olefin polymerizability. Therefore, X and Y are not limited in kind of the ligand so long as the purpose is achieved and there may be exemplified a hydrogen atom, a halogen atom, a hydrocarbon group, or a hydrocarbon group which may have a heteroatom. Of these, preferred is a hydrocarbon group having 1 to 10 carbon atoms or a halogen atom.

(2) Co-Catalyst (Activator Component)

The co-catalyst is a component activating the metallocene complex and is a compound capable of reacting with the auxiliary ligand of the metallocene complex to convert the complex to an active species having olefin polymerizability. Specifically, there may be mentioned (a) an aluminum oxy compound, (b) an ionic compound or Lewis acid capable of reacting with a metallocene complex to convert the metallocene complex into a cation, (c) a solid acid, and (d) an ion-exchangeable layered silicate salt.

(a) Aluminum Oxy Compound

It is well known that an aluminum oxy compound can activate the metallocene complex and, as such a compound, specifically, compounds represented by the following general formulae may be mentioned.

[Chem 2]

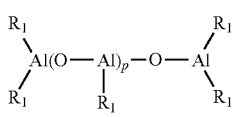

(a)

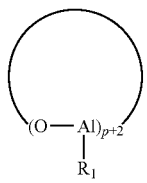

(b)

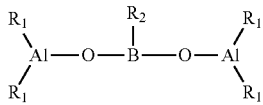

(c)

In the above general formulae (a) and (b), $R_1$ represents a hydrogen atom or a hydrocarbon residue, preferably a hydrocarbon residue having 1 to 10 carbon atoms, particularly preferably a hydrocarbon residue having 1 to 6 carbon atoms. Moreover, a plurality of the $R_1$ groups may be the same or different and p represents an integer of 0 to 40, preferably 2 to 30.

Of the general formulae, the compounds represented by the first and second formulae (the above formulae (a) and (b)) are compounds also called aluminoxanes. Of these, methylaluminoxane or methylisobutylaluminoxane is preferred. A plurality of the above aluminoxanes can be also used in combination within each group or between the groups. The above aluminoxanes can be prepared under known various conditions.

The compound represented by the third formula (the above formula (c)) of the general formulae can be obtained by reacting one kind of trialkylaluminum or two or more kinds of trialkylaluminum with an alkylboronic acid represented by the general formula $R_2B(OH)_2$ in a ratio of 10:1 to 1:1 (molar ratio). In the general formula (c), $R_1$ and $R_2$ represent a hydrocarbon residue having 1 to 10 carbon atoms, preferably 1 to 6 carbon atoms.

(b) Ionic Compound or Lewis Acid Capable of Reacting with Metallocene Complex to Convert Metallocene Complex into Cation The compound is an ionic compound or Lewis acid capable of reacting with a metallocene complex to convert the metallocene complex into a cation. As such an ionic compound, there may be mentioned complexes of a cation such as a carbonium cation or an ammonium cation with an organic boron compound such as triphenylboron, tris(3,5-difluorophenyl)boron, or tris(pentafluorophenyl)boron; and the like.

Moreover, as the Lewis acid mentioned above, various organic boron compounds, e.g., tris(pentafluorophenyl)boron and the like are exemplified. Alternatively, metal halides such as aluminum chloride and magnesium chloride and the like are exemplified.

Some of the above Lewis acids can be grasped as the ionic compound or Lewis acid capable of reacting with a metallocene complex to convert the metallocene complex into a cation. The metallocene catalysts using the aforementioned non-coordinative boron compounds are exemplified in JP-A-3-234709, JP-A-5-247128, and the like.

(c) Solid Acid

As the solid acid, alumina, silica-alumina, silica-magnesia, and the like may be mentioned.

(d) Ion-Exchangeable Layered Compound

The ion-exchangeable layered compound accounts for most part of clay minerals and is preferably an ion-exchangeable layered silicate salt.

The ion-exchangeable layered silicate salt (hereinafter simply abbreviated as "silicate salt" in some cases) refers to a silicate salt compound having a crystal structure where planes composed by ionic bonds are laminated each other in parallel by bonding force and an ion contained is exchangeable. Since most of the silicate salts are naturally produced mainly as major components of clay minerals, the salts frequently contain contaminants (quarts, cristobalite, etc.) other than the ion-exchangeable layered silicate salts but the contaminants may be included.

As the silicate salts, various known ones can be used. Specifically, the following layered silicate salts as described in "Nendo Kobutsugaku (clay mineralogy)" written by Haruo Shiramizu, Asakura Publishing Co., Ltd. (1995) may be mentioned. As 2:1 type minerals, there may be mentioned smectite-group silicates such as montmorillonite, zauconite, beidellite, nontronite, saponite, hectorite, and stevensite; vermiculite-group silicates such as vermiculite; mica-group silicates such as mica, illite, sericite, and glauconite; pyrophyllite-talc-group silicates such as pyrophyllite and talc; clorite-group silicates such as Mg clorite; and the like. As 2:1 ribbon type minerals, there may be mentioned sepiolite, palygorskite, and the like.

The silicate salt to be used as a raw material in the invention may be a layered silicate salt in which the above mixed layer is formed. In the invention, the silicate salt as a main component is preferably a silicate salt having a 2:1 type structure, further preferably a smectite-group one, and particularly preferably montmorillonite. As the silicate to be used in the invention, one obtained as a natural product or an industrial raw material can be used as it is without performing any particular treatment but is preferably subjected to a chemical treatment. Specifically, an acid treatment, an alkali treatment, a salt treatment, an organic substance treatment or the like may be mentioned. These treatments may be used in combination. In the invention, conditions for these treatments are not particularly limited and known conditions can be used.

Moreover, since adsorbed water and inter-layer water are usually included in these ion-exchangeable layered silicate salts, it is preferable to use the salts after removing the water by performing a water-removing treatment with heating under an inert gas stream, for example.

(3) Organoaluminum Compound

As the organoaluminum compound to be used according to needs in the metallocene polymerization catalyst, compounds the same as the organoaluminum compounds to be used in (I) Ziegler polymerization catalyst are used.

Specific compounds are trialkylaluminums such as trimethylaluminum, triethylaluminum, tripropylaluminum, triisobutylaluminum, and trioctylaluminum or alkoxy-containing alkylaluminums such as diethylaluminum methoxide, diisobutylaluminum methoxide, and diisobutylaluminum ethoxide or halide-containing alkylaluminums such as diethylaluminum halides. Of these, particularly, trialkylaluminums are preferred. More preferred are triisobutylaluminum and trioctylaluminum. Further preferred are triisobutylaluminum and tri-n-octylaluminum.

(4) Support

Since the invention relates to a production method of a propylene-based polymer using vapor-phase polymerization, it is preferred to use a supported catalyst using a support. As the support, known ones can be used. As preferable supports, there may be mentioned inorganic compound supports such as silica, titania, alumina, silica-alumina, silica-magnesia, and ion-exchangeable layered silicate salts and polymer supports such as polypropylene powder and polyethylene powder.

Moreover, in order to adjust the shape of particles of the propylene-based polymer and increase the particle diameter, as the support to be used, it is preferred to use a support whose particle shape and particle diameter are controlled. Preferred particle diameter of the support is 1 to 200 μM, further preferably 10 to 150 μm.

The following will describe a production method of the metallocene catalyst.

With regard to the particle diameter of the inorganic compound support as a raw material, it is suitable that usually, an average particle diameter is 0.01 to 5 μm and a fraction of particles of less than 1 μm is 10% or more and preferably, an average particle diameter is 0.1 to 3 μm and a fraction of particles of less than 1 μm is 40% or more. As methods for obtaining inorganic compound support particles having such a particle diameter, there are dry particle-forming methods such as fine particle formation by a jet mill, a ball mill, a vibration mill, or the like or a pulverizing method under wet conditions, pulverization by forced stirring using Polytron or the like, and methods with Dino mill, Pearl mill, or the like.

Moreover, the support may be used after granulation into a preferable particle size. As the granulation method, there may be mentioned an agitation granulation method, a spray granulation method, a tumbling granulation method, briquetting, a fluidized bed granulation method, and a submerged granulation method. Preferable granulation method is the agitation granulation method, the spray granulation method, the tumbling granulation method, or the fluidized granulation method and further preferred is the spray granulation method.

Particle strength will be described later, and its control is also possible in the present granulation step. In order to obtain crushing strength in a preferable range, it is preferred to use an inorganic compound support having a particle diameter distribution as mentioned above.

Furthermore, in the case where granulation is performed in a multistage, the granulation methods may be combined. The combination thereof is not limited but there may be preferably mentioned combinations of the spray granulation method and the spray granulation method, the spray granulation method and the tumbling granulation method, the spray granulation method and the fluidized granulation method.

The shape of the granulated particles obtained by the above granulation method is preferably spherical one. Specifically, there may be mentioned those where, with regard to the particles having a value of M/L (where L represents a value of maximum diameter of the particle in a projection view and M represents a value of diameter orthogonal to L) of 0.8 or more and 1.0 or less, the number of the particles is 50% or more and 100% or less based on the total particles, preferably 85% or more and 100% or less.

Incidentally, the value M/L is a value determined by observing 100 or more arbitrary particles on an optical microscope and performing image processing thereof.

Concentration of the silicate salt in a raw material slurry in the spray granulation from which spherical inorganic compound support particles are obtained is usually 0.1 to 50% by mass, preferably 0.5 to 30% by mass, and more preferably 5.0 to 20% by mass, although the concentration also depends on slurry viscosity. Temperature at the entrance of hot air in the spray granulation from which spherical particles are obtained varies depending on a dispersing medium but, when water is used as an example, the temperature is selected within the range of usually 80 to 260° C., preferably 100 to 220° C.

As the dispersing medium, any one may be used. As the dispersing medium, water and organic solvents such as methanol, ethanol, chloroform, methylene chloride, pentane, hexane, heptane, toluene, and xylene may be used singly or two or more thereof may be used in combination but water is preferred.

The thus obtained inorganic compound support particles may be used as catalyst support without further treatment. In that case, the particle diameter is selected within the range of preferably 1 to 200 μm, more preferably 10 to 150 μm.

Moreover, in order to obtain shape-trimmed particles in a desired particle diameter, a particle diameter of the raw material may be adjusted in at least two stages of the granulation step. For example, the particle shape and particle diameter can be controlled by granulating the material into a particle diameter capable of granulation to some degree in the first stage of the granulation step and again subjecting the product to a granulation treatment.

As such a stepwise granulation method, specifically, first, a raw-material inorganic compound support fine particles having an average particle diameter of 0.01 to 5 μm is granulated to produce primary granulated particles in the first stage of the granulation step. The particle diameter of the primary granulated particles is preferably 1 to 25 μm, more preferably 1 to 15 μm.

Thereafter, the thus granulated primary granulated particles are further transformed into a slurry and then granulated. On that occasion, since the slurry viscosity is relatively low, the slurry concentration can be increased and thus the particle diameter and particle shape suitable as the polymerization catalyst component can be attained by adopting appropriate spray granulation conditions. The final particle diameter is suitably usually 25 to 200 μm, preferably 25 to 150 μm, although it depends on the kind of the raw-material inorganic compound support.

The granulation conditions can be appropriately selected so as to obtain particles having good properties, depending on a granulation method. For example, in the spray granulation method, the entrance temperature of the hot air at spraying can be set in a wide temperature range of about 90° C. to 300° C. Moreover, the exit temperature is defined by a spray flow rate and a hot-air flow rate from a nozzle or disk and is 80° C. to 150° C. As a spraying mode, common spray-drying methods such as a disk type, a pressure nozzle method, and a two-fluid nozzle method can be applied. The control of the particle diameter is possible by setting a flow rate of the spraying liquid, rotation number or size of the disk, pressure of the pressure nozzle, a flow rate of a carrier gas.

When the primary granulated particles are again granulated to produce secondary particles, the secondary particles have a larger size. A particle diameter increase ratio of the primary particles to the raw-material particles is preferably 3 to 500%, further preferably 5 to 300%. Moreover, a particle diameter increase ratio of the secondary particles to the primary particles is preferably 3 to 200%, further preferably 3 to 100%. Therefore, particles having good powder properties can be obtained using different conditions between primary granulation conditions and secondary granulation conditions.

For example, preferable particles can be obtained using lower number of rotation in the secondary granulation than that in the primary granulation. The number of rotation in the secondary granulation is preferably 1,000 to 30,000 rpm, further preferably 5,000 to 20,000 rpm lower than the number of rotation in the primary granulation. Moreover, drying temperature is preferably lower in the secondary granulation than that in the primary granulation. The entrance temperature of hot air in the secondary granulation is preferably 10 to 80° C., further preferably 20 to 50° C. lower than the entrance temperature of hot air in the primary granulation.

Specifically, in the primary granulation, the entrance temperature of hot air is preferably 130 to 250° C., further preferably 150 to 200° C., although it depends on the disk size. The number of disk rotation is preferably a condition of 10,000 to 30,000 rpm. In the secondary granulation, the entrance temperature of hot air is preferably 90 to 180° C., further preferably 100 to 150° C.

At the granulation, an organic substance, an inorganic solvent, an inorganic salt, various binders may be used. As binders to be used, there may be, for example, mentioned sugar, dextrose, corn syrup, gelatin, glue, carboxymethyl celluloses, polyvinyl alcohol, water glass, magnesium chloride, aluminum sulfate, aluminum chloride, magnesium sulfate, alcohols, glycol, starch, casein, latex, polyethylene glycol, polyethylene oxide, tar, pitch, alumina sol, silica gel, gum arabic, sodium alginate, and the like.

Thus, a supported catalyst having trimmed particle shape and particle diameter can be produced by supporting the metallocene complex on the granulated inorganic compound support.

3. Pre-Polymerization Treatment

In the invention, irrespective of use of either catalyst of the Ziegler polymerization catalyst and the metallocene polymerization catalyst, it is preferred to use the catalyst after a pre-polymerization treatment prior to the use in main polymerization. By the use of the catalyst subjected to pre-polymerization, the generation of fine powdery propylene-based polymer can be inhibited and also the powder properties of the propylene-based polymer can be improved.

The catalyst after the pre-polymerization is covered with a polymer shell and an average particle diameter (size including the polymer shell) of the catalyst to be used in main polymerization is preferably 30 μm or more, further preferably 40 μm or more and preferably 300 μm or less, further preferably 200 μm or less.

The pre-polymerization treatment of the polyolefin polymerization catalyst component can be carried out in the presence of an organoaluminum compound the same as the organoaluminum compound mentioned above. Temperature at the pre-polymerization is 10 to 80° C. and an α-olefin is reacted in an amount of 0.1 to 100 g, preferably 0.5 to 50 g per g of the polyolefin polymerization catalyst component in an inert solvent over a period of 10 minutes to 48 hours.

In the pre-polymerization, particularly in the case of the Ziegler polymerization catalyst, an electron donor the same as the electron donor mentioned above can be also used. In the case where the electron donor is an organosilicon compound, it may be used in the range of 0.01 to 10 mol per mol of the organoaluminum compound.

The α-olefin to be used in the pre-polymerization is ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, 3-methyl-1-pentene, or the like. They may be used not only singly but also as a mixture of two or more olefins including other α-olefin. Moreover, in order to regulate molecular weight of the polymer to be formed, a molecule regulator such as hydrogen can be also used in combination at the polymerization.

The inert solvent to be used in the pre-polymerization treatment is an inert solvent which does not remarkably influence the polymerization reaction, e.g., liquid saturated hydrocarbons such as hexane, heptane, octane, decane, dodecane, and liquid paraffin, silicone oils having a dimethylpolysiloxane structure, and the like. These inert solvents may be either one kind of a single solvent or a mixed solvent of two or more thereof.

At the use of these inert solvents, it is preferred to use them after removal of water and impurities such as sulfur compounds which adversely affect the polymerization.

The pre-polymerization treatment may be performed two or more times and monomers to be used on this occasion may be the same or different. Moreover, after the pre-polymerization, it is also possible to perform washing with an inert solvent such as hexane or heptane. After the pre-polymerization is finished, depending on the use mode of the catalyst, it may be used as it is but, if necessary, drying may be performed. Furthermore, at the contact of the above individual components or after the contact, a polymer such as polyethylene, polypropylene, or polystyrene and/or an inorganic oxide solid such as silica or titania can be also co-present.

4. Polymerization Mode and Polymerization Reactor

In the invention, the production of the propylene-based polymer obtained by polymerizing propylene or propylene and the other α-olefin is carried out by a continuous vapor-phase polymerization method using a horizontal polymerization reactor equipped with stirring vanes rotating around a horizontal axis in the inside of the reactor.

In the invention, the vapor-phase polymerization method does not mean that any liquid is not present at all. It is sufficient that a phase for carrying out the polymerization is substantially a vapor phase and a liquid may be present in a range where deviation from the gist of the invention is not derived. As the liquid, not only liquefied propylene for heat removal but also an inorganic hydrocarbon component such as hexane can be exemplified.

The reactor according to the invention depends on the raw material to be used, the reaction conditions, the reaction mode, the product, etc. and can be arbitrarily select from existing ones and used without limitation in size, material, and the like so long as it is suitable for the reaction. The shape is preferably a horizontal polymerization reactor having a cylindrical part. Since heat removal is performed using heat of vaporization of liquefied propylene, the reactor is preferably fitted with a recycling apparatus which extracts a gas containing propylene from the reactor, cools the gas to liquefy at least a part thereof, and feeds at least a part of the liquefied component into the reactor. The size of the reactor is arbitrary according to individual reaction modes and the like. The volume is usually 0.1 m$^3$ or more and, from the viewpoints of industrial productivity and economical efficiency, preferably 20 m$^3$ or more. The ratio of length to diameter is preferably 2.0 or more from the viewpoints of industrial productivity and economical efficiency.

In general, in the case where polymerization is carried out by a vapor-phase process using a horizontal polymerization reactor equipped with stirring vanes rotating around a horizontal axis in the inside of the reactor, the amount of the aggregated polymer increases by an abnormal reaction by the influence of local heat generation and the like in the reactor and thus an amount of fine powder tends to increase due to physical contact of the aggregated polymer with the stirrer.

The production method of the propylene-based polymer of the invention has a characteristic that the generation of the aggregated polymer and, as a result, the generation of fine powder can be inhibited by appropriately controlling the reaction through setting temperature difference between areas of the reactor and thus safety and productivity on operation can be improved.

With regard to the arrangement of the reactor, any method can be used unless the gist of the invention is inhibited. The reactor may be one or two or more and, in the case where two or more thereof are used, they may be connected serially or may be connected in parallel.

As a particularly preferable example, a reaction apparatus in which two to four reactors are connected serially can be exemplified. Particularly, in the case where a block copolymer of propylene and the other α-olefin is produced, an arrangement containing at least serially connected two reactors is preferred. A method of arranging two or more reactors is not particularly limited but, in the case where a plurality of the horizontal polymerization reactors equipped with stirring vanes rotating around a horizontal axis in the inside of the reactor are used, the rotation axis of the stirrer of an upstream reactor is arranged at the same or higher height as compared with the rotation axis of the stirrer of a downstream reactor, preferably is arranged at a certain height which is higher than the rotation axis of the stirrer of a downstream reactor.

As a method of narrowing the residence time distribution without increasing the number of the reactors, the narrowing is possible by providing a weir for limiting the transfer of powder in the inside of the reactor. As a mode of the weir, a fixed weir fixed to the reactor may be used or a rotation weir fixed to a rotation axis may be used. The residence time can be also arbitrarily changed depending on an amount of production.

The catalyst can be fed from any position but it is preferred to feed it from an upper part of an upstream portion of the reactor. The catalyst feed part is preferably placed in an area at a distance of 0 to 15%, preferably 2.5 to 10% of the length of the reactor to a downstream direction from the most upstream end of the reactor. When the distance is 2.5% or more, the catalyst is difficult to attach to an inner wall of the reactor, the generation of the aggregate or aggregated polymer can be inhibited, and operation stability can be enhanced. When the distance is 10% or less, the residence time of the catalyst in the reactor is not exceedingly short and decrease in activity can be suppressed, so that the case is economically advantageous.

The catalyst for polymerization and the other optional components of the invention can be fed to the reactor using known methods. The polymerization catalyst may be fed to the reactor as it is in a powder form but may be fed after dilution with an inert solvent such as hexane or a mineral oil.

Moreover, the organoaluminum compound may be fed as an component in the catalyst after the contact with the Ziegler solid catalyst component and the metallocene complex component or may be fed separately from these components.

5. Removal of Heat by Heat of Vaporization

As a method of removing heat using heat of vaporization of liquefied propylene, any method can be used.

In order to remove heat using the heat of vaporization of liquefied propylene, it is sufficient to feed propylene in a substantially liquid state to the reactor. Although fresh liquefied propylene can be fed to the reactor, in general, it is desirable to use recycled propylene. A common procedure for using recycled propylene is exemplified in the following.

A gas containing propylene is abstracted from the reactor, the gas is cooled to liquefy at least a part thereof, and at least a part of the liquefied component is fed to the reactor. On this occasion, the component to be liquefied should contain propylene but may contain comonomer components including butene as a representative and inert hydrocarbon components including iso-butane as a representative.

As a method of feeding liquefied propylene, any method can be used so long as it is a method of feeding propylene in a substantially liquid state to the reactor. Propylene may be fed to a bed of the propylene-based polymer particles or may be fed to a vapor-phase part. In the case where it is fed to a vapor-phase part, it may be fed to a vapor-phase part in the inside of the reactor or may be fed to a recycling gas line. Particularly, it is preferred to feed it to a vapor-phase part in the inside of the reactor.

In the invention, the removal of heat using the heat of vaporization of liquefied propylene does not mean that the removal of heat is performed using the heat of vaporization of liquefied propylene alone. The other method of removing heat can be used in combination unless it does not deviate from the gist of the invention. Specifically, there may be exemplified a method of removing heat using a jacket fitted to the reactor, a method of extracting a part of gas from the reactor, cooling the gas by means of a heat exchanger, and again returning the gas to the reactor, or the like. However, in the invention, it is necessary that the removal of heat using the heat of vaporization of liquefied propylene is a main one. Specifically, in at least one reactor, at least a half of heat to be removed should be removed using the heat of vaporization of liquefied propylene.

6. Structure of Polymerization Reactor and Temperature Control

In a steady state operation, a polymer bed is formed in the whole horizontal polymerization reactor and the polymerization reaction is carried out in all the areas. Since an industrially useful ratio of length to diameter of the reactor is 2.0 or more, it is important that temperature control is performed with dividing the inside into individual areas from the viewpoint of operation stability. On the reactor, generally, liquefied propylene-feeding pipes placed at intervals along the upper part, mix gas-feeding pipes placed at intervals along the bottom part, and differential thermometers are installed and the temperature control is individually performed mainly by the flow rate of liquefied propylene from the upper pipes. Secondarily, it is also possible to use differential introduction and flow rate of the mix gas as controlling factors.

Here, one example of the horizontal polymerization reactor is precisely described with reference to FIG. 1. The horizontal polymerization reactor 10 is an elongated one and fitted with barrier walls 10a and 10b and, as shown in FIG. 1, the reactor is commonly placed in a horizontal position. The polymerization reaction is carried out at a space sandwiched between the barrier walls 10a and 10b.

In FIG. 1, the barrier wall 10a is an upstream end 12 of the reactor and the barrier wall 10b is a downstream end 14 of the reactor. Incidentally, although not shown in the figure, in the case where the barrier wall is a curved one, tops of individual curves are the upstream end and the downstream end of the reactor.

The area section including an upstream end of the horizontal polymerization reactor in the invention represents an area section including the upstream end 12 and the area section including a downstream end represents an area section including the downstream end 14. Temperature at each area section is a value indicated by each differential thermometer placed in the reactor.

A horizontal axis 20a of a stirrer 20 extends into the reactor downstream end 14 of the horizontal polymerization reactor 10 and a plurality of stirring blades 20b for stirring are fitted in the horizontal polymerization reactor 10. The stirring blades 20b may mix the polymer particles with other substances to be introduced therein in the horizontal polymerization reactor 10.

The catalyst component fed from catalyst component-feeding pipes 1, 2 (it is possible to use only one pipe according to needs) of the horizontal polymerization reactor 10 starts polymerization while the component is mixed with polymer particles by the stirring vanes 20b. The catalyst component-feeding pipes 1, 2 can be placed at any positions unless they deviate from the gist of the invention. The heat of polymerization generated at polymerization is removed by the heat of vaporization of liquefied propylene fed from a raw-material liquefied propylene-feeding pipe 19.

Unreacted propylene gas is discharged into the outside of the reaction system from an unreacted gas-extracting pipe 13 and a part thereof is condensed at a condenser 15 and is separated into a liquid phase and a vapor phase in a gas-liquid separation tank 11. The liquid phase part is re-introduced into the raw-material liquefied propylene-feeding pipe 19 for removal of heat of polymerization and the vapor phase part is mixed with hydrogen for molecular weight control and is again fed via a raw-material mix gas-feeding pipe 18 placed at a bottom part of the horizontal polymerization reactor 10. The polymer particles are transferred from an upstream part to a downstream part in the polymerization tank with undergoing reaction and mixing and then discharged into the outside of the reaction system from a polymer-extracting pipe 23.

Polymerization conditions such as pressure, residence time, and temperature can be arbitrarily set unless they deviate from the gist of the invention.

Specifically, polymerization pressure is preferably 1,200 kPa or more, further preferably 1,400 kPa or more, particularly preferably 1,600 kPa or more and preferably 4,200 kPa or less, further preferably 3,500 kPa or less, particularly preferably 3,000 kPa or less. However, the polymerization pressure should not be set higher than the vapor pressure of propylene. In general, in a horizontal polymerization reactor, since a gas phase is circulated, the polymerization pressure in the same reactor is kept constant. Moreover, physical division is possible by a weir-shaped article placed in the reactor and thus different pressure operations are possible in the same reactor.

The residence time can be arbitrarily adjusted according to the constitution of the reactor and product index. In general the time is set within the range of 30 minutes to 5 hours.

The polymerization temperature is preferably 0° C. or higher, further preferably 30° C. or higher, particularly preferably 40° C. or higher and preferably 100° C. or lower, further preferably 90° C. or lower, particularly preferably 80° C. or lower.

For the horizontal polymerization reactor (hereinafter also simply referred to as "reactor") to be used in the invention, it is possible to set a plurality of area sections different in temperature in a horizontal axis direction in the inside thereof. In the invention, the area section represents not a physical area section using a weir but an area section in which temperature control is performed.

Moreover, although the same reaction conditions are commonly used in a single polymerization reactor, in the invention, when the reactor is divided into i pieces (i is an arbitrary integer of 2 or more) of the area sections from an upstream to a downstream direction, by the production method wherein respective reaction temperatures Tn and Tn+1 of n-th (n is an integer of 1 or more and (i−1) or less) area section (n) and an area section (n+1) adjacent thereto on the downstream side satisfy Tn≤Tn+1, it becomes possible to control the polymerization temperature according to the polymerization properties using each of the Ziegler catalyst and the metallocene catalyst and thus it is effective for inhibition of the aggregated polymer to be generated by insufficient heat removal resulting from local heat generation and the like.

In the invention, with regard to the polymerization temperature in the reactor, the reactor temperatures Tn of a plurality of the area sections (n) can be individually controlled at different temperatures by the differential thermometers placed in the reactor.

The differential thermometer to be placed is any one according to the reactor volume and the reaction mode but it is preferred to control at least an upstream part, a middle part, and a downstream part (corresponding to i=3). The differential thermometer is placed on-by-one in areas at a distance of 0 to 30%, 30 to 70%, and 70 to 100% of length of the reactor from the most upstream end of the reactor to a downstream direction and thus three or more thermometers are placed. Namely, the number i of the area sections is preferably 3 or more.

In an embodiment 1 according to the invention, at least one of the following requirements (A) and (B), is satisfied.

Requirement (A): temperature difference $\Delta T1$ (° C.) (=Tω−Tα) between temperature (Tα) of an area section including an upstream end of the reactor and temperature (Tω) of an area section including a downstream end thereof is 0.1 to 20° C.;

Requirement (B): temperature difference $\Delta T2$ (° C.) (=Tx−Tz) between temperature (Tx) of an area section including a catalyst feed part and dew point (Tz) of mix gas in the reactor is 0 to 5° C.

The "temperature of an area section including an upstream end" (hereinafter also simply described as "temperature of an upstream end") (Tα) and the "temperature of an area section including a downstream end" (hereinafter also simply described as "temperature of a downstream end") (Tω) represent values indicated by the differential thermometers placed in the area of the most upstream end and the area of the most downstream end, respectively.

With regard to the requirement (A), the temperature difference $\Delta T1$ (° C.) (=Tω−Tα) between temperature (Tα) of an upstream end of the reactor and temperature (Tω) of a downstream end is 0.1 to 20° C. and the lower limit is preferably 2° C. or more, more preferably 5° C. or more and the upper limit is preferably 15° C. or less, more preferably 12° C. or less. When $\Delta T1$ is less than 0.1° C., a reaction inhibiting effect at the early stage of polymerization is poor and effects of inhibiting the aggregated polymer and inhibiting fine particles to be induced by power morphology deterioration decrease, so that operation control is not stabilized. Moreover, an effect of improving productivity to be exhibited with temperature elevation at the downstream part of the reactor is not sufficiently obtained. When $\Delta T1$ exceeds 20° C., temperature change in the single reactor becomes large and there is a concern that compositional change of the polymer may be induced.

With regard to the requirement (B), in the invention, the polymerization reaction is carried out so that the temperature difference $\Delta T2$ (° C.) (=Tx−Tz) between the temperature (Tx) of an area section including the catalyst feed part and the dew point (Tz) of the mix gas in the reactor becomes 0 to 5° C., preferably 1 to 3° C. When the temperature difference $\Delta T2$ falls within the range, unstable operation to be induced by condensation of propylene in the reactor because the polymerization temperature and the dew point are too near and easy generation of the aggregated polymer can be prevented. Also, in the catalyst feed part where the catalyst concentration is high and the heat generation is large, there can be prevented the formation of the aggregated polymer which may result from the occurrence of melting of the formed polymer and the like owing to local heat generation to be induced by insufficient heat removal since the amount of liquefied propylene to be used for heat removal from the powder layer in the catalyst feed part decreases due to too high polymerization temperature relative to the dew point. Moreover, it can be prevented that the power morphology is deteriorated by a rapid reaction and the powder is prone to be pulverized by stirring and fluidization with the gas, particularly the generation of fine powder is increased by the pulverization of the powder at stirring.

In an embodiment 2 according to the production method of the invention, either the following requirement (C) or (D) is satisfied.

Requirement (C): temperature difference $\Delta T1$ (° C.) (=Tω−Tα) between temperature (Tα) of an area section including an upstream end of the reactor and temperature (Tω) of an area section including a downstream end thereof is 0.1 to 20° C. and temperature difference $\Delta T2$ (° C.) (=Tx−Tz) between temperature (Tx) of an area section including a catalyst feed part and dew point (Tz) of mix gas in the reactor is 1 to 20° C.;

Requirement (D): temperature difference $\Delta T1$ (° C.) (=Tω−Tα) between temperature (Tα) of an area section including an upstream end of the reactor and temperature (Tω) of an area section including a downstream end thereof is 2 to 15° C. and temperature difference $\Delta T2$ (° C.) (=Tx−Tz) between temperature (Tx) of an area section including a catalyst feed part and dew point (Tz) of mix gas in the reactor is 0 to 5° C.

With regard to the requirement (C), the temperature difference $\Delta T1$ (° C.) (=Tω−Tα) between the temperature (Tα) of an upstream end of the reactor and the temperature (Tω) of a downstream end is the same as in the aforementioned requirement (A). Furthermore, in the requirement (C), the polymerization reaction is carried out so that the temperature difference $\Delta T2$ (° C.) (=Tx−Tz) between the temperature (Tx) of an area section including the catalyst feed part and the dew point (Tz) of the mix gas in the reactor is 1 to 20° C. $\Delta T2$ is preferably 2° C. or more, further preferably 3° C. or more. More preferably, it is 18° C. or less, further preferably 15° C. or less. When the temperature difference $\Delta T2$ falls within the range, unstable operation to be induced by condensation of propylene in the reactor since the polymerization temperature and the dew point are too near and easy generation of the aggregated polymer can be prevented. Also, there can be prevented easy formation of the aggregated polymer which may result from the melting of the formed polymer and the like owing to local heat generation to be induced by insufficient heat removal because of too high polymerization temperature relative to the dew point. Moreover, it can be prevented that the power morphology is deteriorated by a rapid reaction and the powder is prone to be pulverized by stirring and fluidization with the gas, particularly generation of fine powder is increased by the pulverization of the powder at stirring and thus the amount of entrainment increases.

With regard to the requirement (D), it is characterized in that the temperature (Tα) of an upstream end of the reactor and the temperature (Tω) of a downstream end thereof are different from each other and the temperature difference $\Delta T1$ (° C.) (=Tω−Tα) is 2 to 15° C. The polymerization reaction is carried out so that $\Delta T1$ is 2° C. or more and 15° C. or less, preferably 5° C. or more and 15° C. or less. When $\Delta T1$ is less than 2° C., a reaction inhibiting effect at the early stage of polymerization is poor and effects of inhibiting the aggregated polymer and inhibiting fine particles to be induced by power morphology deterioration decrease, so that operation control is not stabilized. Moreover, an effect of improving productivity to be exhibited with temperature elevation at the downstream part of the reactor is not sufficiently obtained. When $\Delta T1$ exceeds 15° C., temperature change in the single reactor becomes large and there is a concern that compositional change of the polymer may be induced.

With regard to the requirement (D), the temperature difference $\Delta T2$ (° C.) (=Tx−Tz) between the temperature (Tx) of an area section including the catalyst feed part and the dew point (Tz) of mix gas is the same as in the aforementioned requirement (B).

In the invention, in the reactor, it is not necessary that the area section including the catalyst feed part and the area section including the upstream end are the same. Namely, this fact means that it is not necessary that the temperature (Tx) of an area section including the catalyst feed part and the temperature (Tα) of an area section including an upstream end of the reactor are the same.

Incidentally, the dew point (Tz) of the mix gas in the reactor was calculated according to the method described in Kagaku Kogaku Binran (Chemical Engineering Handbook) revised 5th version (published by Maruzen Co., Ltd.; p. 485).

Figure 2:
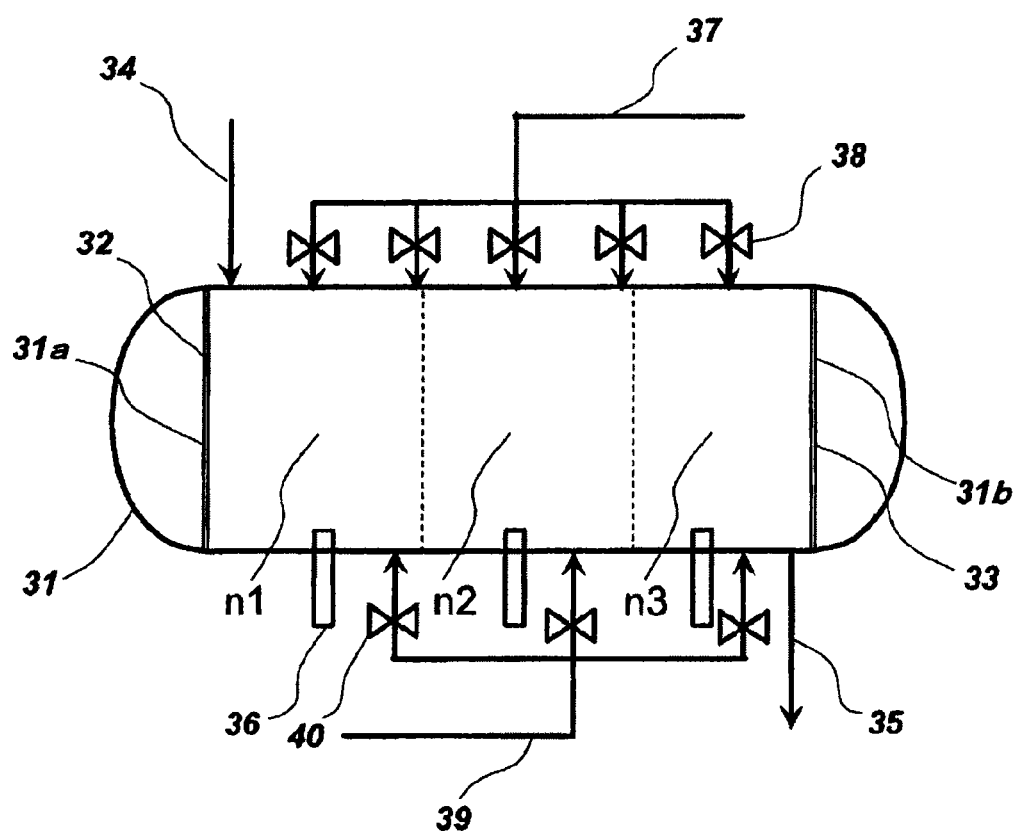
FIG. 2 is a schematic drawing showing one example of arrangement of differential thermometers in the horizontal polymerization reactor to be used in the production method of the invention.

Here, one example of temperature control in the horizontal polymerization reactor will be described in detail with reference to FIG. 2. A horizontal polymerization reactor 31 is fitted with barrier walls 31a and 31b and the area is divided into 3 sections of n1 to n3. The barrier wall 31a on the upstream side is a reactor upstream end 32 and the barrier wall 31b on the downstream side is a reactor downstream end 33. In FIG. 2, the section n1 is an area section including the upstream end and the section n3 is an area section including the downstream end. The catalyst component is fed from a catalyst component-feeding pipe 34 of the reactor. In FIG. 2, a stirrer is omitted.

At the polymerization, the heat of polymerization to be generated is removed by the heat of vaporization of the raw-material liquefied propylene to be fed from a raw-material liquefied propylene-feeding pipe 37. The polymerization temperature in each area section is detected by a differential thermometer 36 placed in each area section and may be individually controlled by the combination of the flow rate of the raw-material liquefied propylene placed at specific intervals at the upper part and the flow rate of the temperature-controlled mix gas from a raw-material mix gas-feeding pipe 39 placed at specific intervals at the lower part. Each flow rate is controlled by operating valves 38 and 40.

The propylene-based polymer formed by the polymerization reaction is extracted from a polymer-extracting pipe 35 so that the amount of the polymer in the reactor is constant.

Although the same reaction conditions are commonly used in a single polymerization reactor, in the invention, when the reactor is divided into pieces (i is an arbitrary integer of 2 or more) of the area sections from an upstream to a downstream direction, by the production method wherein respective reaction temperatures Tn and Tn+1 of n-th (n is an integer of 1 or more and (i−1) or less) area section (n) and an area section (n+1) adjacent thereto on the downstream side satisfy Tn≤Tn+1, it becomes possible to control the polymerization temperature according to the polymerization properties using each of the Ziegler catalyst and the metallocene catalyst and thus it is effective for inhibition of the aggregated polymer to be generated by insufficient heat removal caused by local heat generation and the like.

A method of setting temperature from the reactor upstream end to the downstream end can be arbitrarily set unless it deviates from the gist of the invention.

Figure 3:
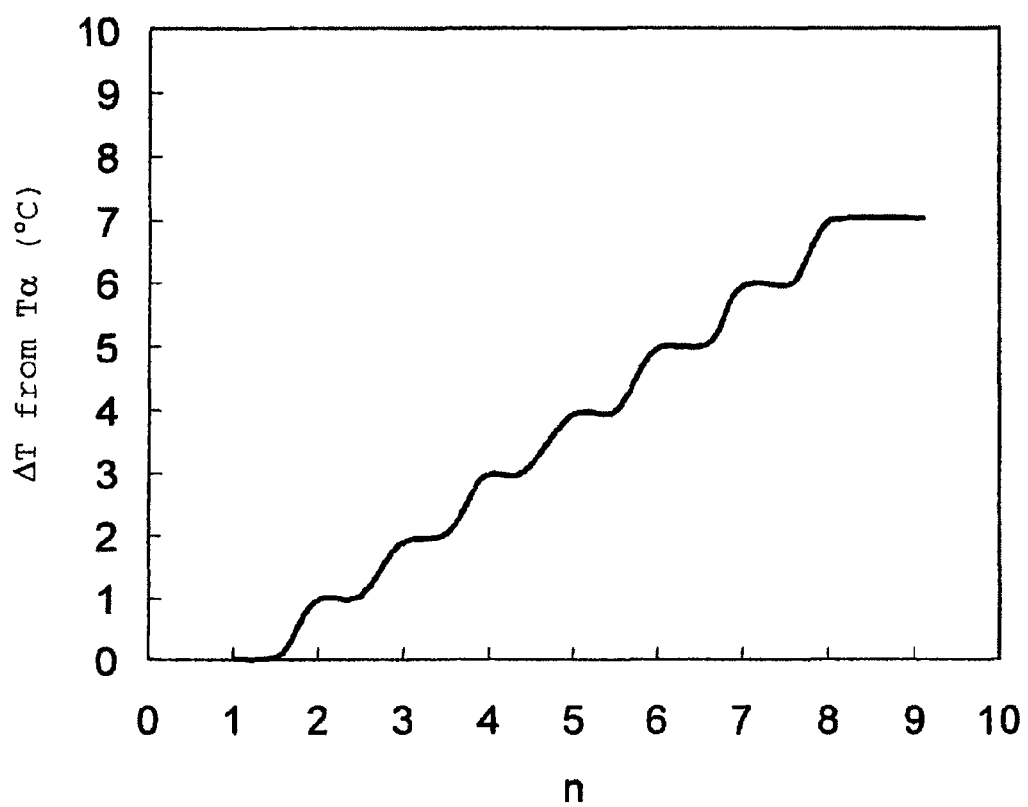
FIG. 3 is an explanatory drawing of temperature control in area sections of the horizontal polymerization reactor to be used in the production method of the invention.
Figure 4:
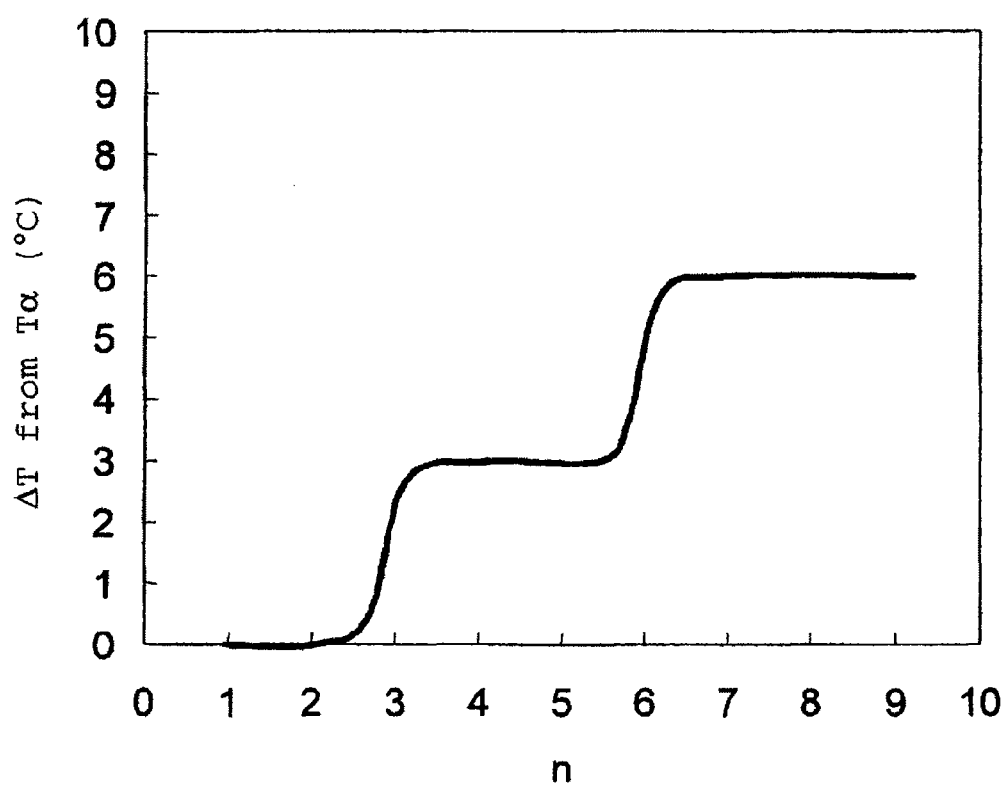
FIG. 4 is an explanatory drawing of temperature control in area sections of the horizontal polymerization reactor to be used in the production method of the invention.

In FIG. 3 and FIG. 4, a temperature-setting method of the area sections i=10 is described as one example. The temperature control is performed in 8 areas in FIG. 3 and in 3 areas in FIG. 4.

Figure 5:
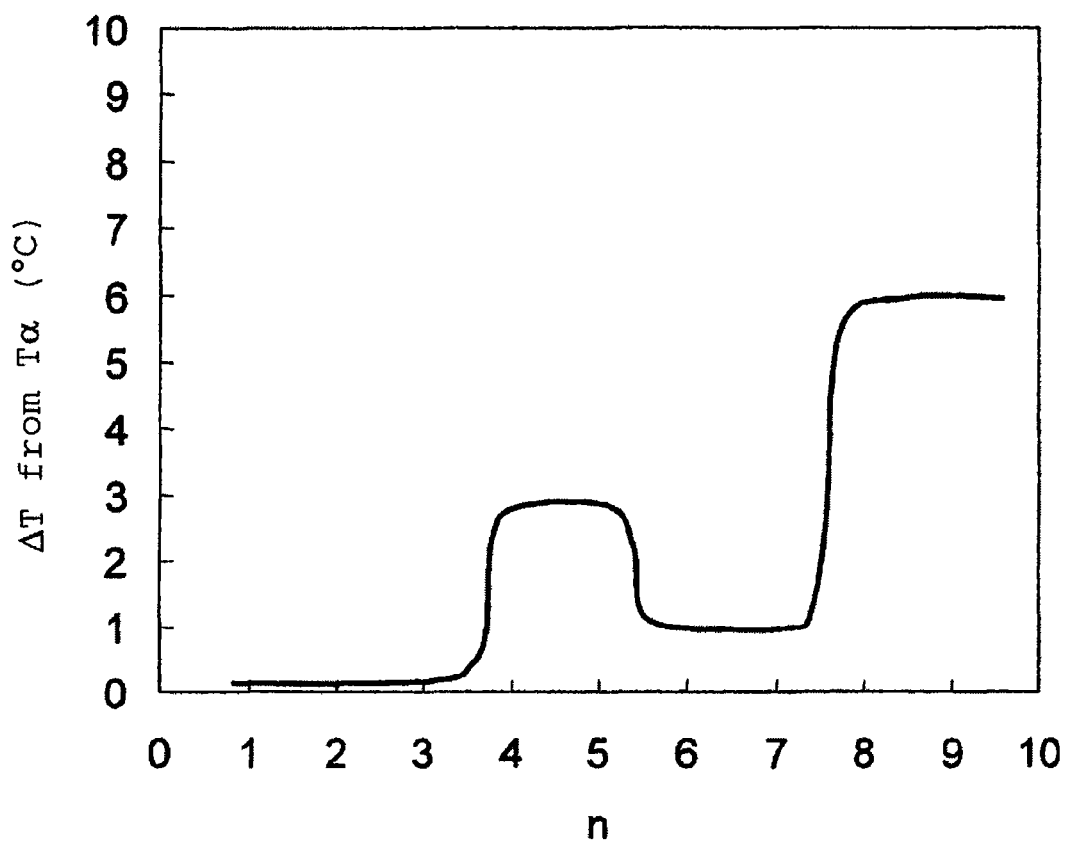
FIG. 5 is an explanatory drawing of temperature control in area sections of the horizontal polymerization reactor to be not used in the production method of the invention.

In both cases, by the reaction-inhibiting effect owing to relatively low polymerization temperature at an initial stage of polymerization and the productivity-improving effect owing to relatively high polymerization temperature over a middle stage of polymerization to a late stage of polymerization, the temperature control is effective for effects of inhibiting the aggregated polymer and inhibiting fine powder to be induced by powder morphology deterioration, and for improvement in efficiency of production. In the control where temperature is once lowered and then temperature is elevated at a middle area section as shown in FIG. 5, not only effects of inhibiting the aggregated polymer and inhibiting fine powder to be induced by powder morphology deterioration are poor but also productivity of powder decreases and thus the control is also economically disadvantageous.

The amount of entrainment in the invention means an amount of particles passing through an unreacted gas-extracting pipe placed on the upper tank wall (may be also the side part or the bottom part) of the reactor and being transferred to the outside of the reactor together with unreacted gas. As a method of specifically measuring the amount of entrainment, there may be exemplified a method of weighing an amount [g/kg] of fine powder removed by a fine particle-removing facility such as a cyclone or a bag filter placed before a condenser and dividing the amount by an amount of production.

At the production of the propylene-based polymer, the amount of entrainment is preferably 0.10 g/kg or less.

When the value is high, there is a concern that load and attachment to the gas-extracting pipe system is increased by the increase in entrainment or gas-condensing ability is lowed by the influx of fine powder into the condenser.

In the case where polymerization is carried out in the horizontal polymerization reactor, the particles of the propylene-based polymer advance along the axis direction of the reactor with gradual growing, by two forces of the formation of the propylene-based polymer by the polymerization reaction and mechanical stirring, so that the flow pattern becomes a piston flow type. Therefore, it is possible to receive different temperature histories from a catalyst feed port to a powder discharge port.

A slow activation at an initial stage of the reaction is possible by adopting the technique according to the invention and, irrespective of the Ziegler catalyst and the metallocene catalyst, the technique becomes an effective method for inhibition of a disordered polymerization reaction to be induced by local heat generation in the catalyst feed part, particularly inhibition of the aggregated polymer formation to be generated due to easy occurrence of a rapid polymerization rate, and inhibition of formation of an easily crushable polymer having a deteriorated morphology and generation of fine powder which lead to generation of an amount of entrainment.

By the inhibition of the generation of the aggregated polymer and the fine powder in the reactor, it also becomes possible to further enhance continuity of production and stability of operation. Moreover, the catalyst activity is retained high and production costs can be suppressed, so that the technique is economical.

The propylene-based polymer particularly preferably produced in the invention is a propylene-based polymer having a melting peak temperature (Tm) (hereinafter also referred to as melting point) of 105° C. or higher and 140° C. or lower. When the melting point is remarkably higher than the above range, low-temperature heat-sealing properties become insufficient. Moreover, when the melting point is remarkably lower than the above range, there is a concern that a part of the polymer itself may melt at an industrially possible polymerization temperature, so that it becomes difficult to maintain stable operation.

However, in the production method of the invention, it is not meant that a propylene-based polymer having a melting point other than such a melting point is excluded.

The propylene-based polymer having such a low melting point is preferably produced by using a catalyst in which the metallocene compound is supported on a support.

The most use can be made of the characteristics of the metallocene catalyst, i.e., narrow crystalline and molecular weight distribution and a small amount of low crystallinity/low molecular weight components, and it becomes possible to produce a polymer excellent in low-temperature heat-sealing properties, which is difficult to produce with the conventional Ziegler-Natta catalyst.

In the case where the polymer to be produced is a propylene-ethylene random copolymer, ethylene content in the copolymer is controlled so that the melting point of the copolymer falls within the range of 105 to 140° C. and, although the content depends on the catalyst used, in the case of the metallocene catalyst, the content is generally in the range of 1 to 10% by mass.

In the invention, the melting peak temperature (Tm) is a value measured by differential scanning calorimetry (DSC). Specifically, the temperature is a peak temperature at the time when a sample is heated from room temperature to 230° C. under a condition of 80° C./minute, maintained at the temperature for 10 minutes, then cooled to 50° C. at a rate of −10° C./minute, maintained at the temperature for 3 minutes, and then melted under a heating condition of 10° C./minute using a DSC7 model differential scanning calorimeter manufactured by Perkin-Elmer Corporation.

On that occasion, it is sufficient to regulate a value of a gas concentration molar ratio of ethylene to propylene (ethylene/propylene) in the reactor so that the above melting point is obtained but the value is in the range of preferably 0.01 to 0.5, more preferably 0.01 to 0.3, further preferably 0.02 to 0.2.

The polymer may be produced using a multi-stage polymerization method depending on the purpose. In that case, the polymer to be produced at the first stage is preferably a polymer having the above characteristics and the component of the polymer to be produced at the second stage or later is not particularly limited.

Ethylene content in the polymer is determined by NMR and, in the case of using the multi-stage polymerization method, the polymer polymerized at the first stage is a target. The following shows a specific method.

i) Measurement of Ethylene Content by NMR

The ethylene content of the obtained polymer is determined by analyzing a 13C-NMR spectrum measured by a proton complete decoupling method according to the following conditions.

Model: GSX-400 manufactured by JEOL or an equivalent apparatus (carbon nuclear magnetic resonance frequency of 100 MHz or more)

Solvent: o-dichlorobenzene:deuterated benzene=4:1 (volume ratio)

Concentration: 100 mg/ml

Temperature: 130° C.

Pulse angle: 90°

Pulse interval: 15 seconds

Number of integration times: 5,000 times or more ii) Spectrum

Assignment of the spectrum can be performed with reference to Macromolecules, 17, 1950 (1984), for example. The assignment of the spectrum measured under the above conditions are as shown in the following Table 1. In the table, the symbols such as $S\alpha\alpha$ are in accordance with the notation of Carman et al. (Macromolecules, 10, 536 (1977)) and P represents methyl carbon, S represents methylene carbon, and T represents methine carbon.

TABLE 1

| Chemical shift (ppm) | Assignment |
|---|---|
| 45 to 48 | $S_{\alpha\alpha}$ |
| 37.8 to 37.9 | $S_{\alpha\gamma}$ |
| 37.4 to 37.5 | $S_{\alpha\delta}$ |
| 33.1 | $T_{\delta\delta}$ |
| 30.9 | $T_{\beta\delta}$ |
| 30.6 | $S_{\gamma\gamma}$ |
| 30.2 | $S_{\gamma\delta}$ |
| 29.8 | $S_{\delta\delta}$ |
| 28.7 | $T_{\beta\beta}$ |
| 27.4 to 27.6 | $S_{\beta\delta}$ |
| 24.2 to 24.7 | $S_{\beta\beta}$ |
| 19.1 to 22.0 | P | iii) Calculation of Ethylene Content

In the following, when "P" is a propylene unit in a copolymer chain and "E" is an ethylene unit, there may be present 6 kinds of triads of PPP, PPE, EPE, PEP, PEE, and EEE in the chain. As described in Macromolecules, 15, 1150 (1982) and the like, concentration of these triads and peak intensity of the spectrum are linked by the following relational expressions (1) to (6).

$$[PPP] = k \times I(T\beta\beta) \quad (1)$$

$$[PPE] = k \times I(T\beta\delta) \quad (2)$$

$$[EPE] = k \times I(T\delta\delta) \quad (3)$$

$$[PEP] = k \times I(S\beta\beta) \quad (4)$$

$$[PEE] = k \times I(S\beta\delta) \quad (5)$$

$$[EEE] = k \times \{I(S\delta\delta)/2 + I(S\gamma\delta)/4\} \quad (6)$$

Here, [ ] represents a fraction of a triad and, for example, [PPP] is a fraction of a PPP triad in all the triads. Therefore, $$[PPP]+[PPE]+[EPE]+[PEP]+[PEE]+[EEE]=1 \quad (7).$$

Moreover, k is a constant and I represents spectrum intensity. For example, I(Tββ) means intensity of a peak of 28.7 ppm which is assigned to Tββ.

By using the above relational expressions (1) to (7), the fraction of each triad is determined and further the ethylene content is determined by the following expression.

Ethylene content (% by mol)=([PEP]+[PEE]+ [EEE])×100

Incidentally, in the invention, [propylene random copolymer component] produced using the metallocene catalyst contains a small amount of propylene irregular bonds (2,1-bond and/or 1,3-bond) and thereby, the following minute peaks are formed.

TABLE 2

| Chemical shift (ppm) | Assignment |
| --- | --- |
| 42.0 | $S_{\alpha\alpha}$ |
| 38.2 | $T_{\alpha\gamma}$ |
| 37.1 | $S_{\alpha\delta}$ |
| 34.1 to 35.6 | $S_{\alpha\beta}$ |
| 33.7 | $T_{\gamma\gamma}$ |
| 33.3 | $T_{\gamma\delta}$ |
| 30.8 to 31.2 | $T_{\beta\gamma}$ |
| 30.5 | $T_{\beta\delta}$ |
| 30.3 | $S_{\alpha\beta}$ |
| 27.3 | $S_{\beta\gamma}$ |

In order to determine accurate ethylene content, it is necessary to consider the peaks derived from these irregular bonds and include them in calculation. However, since it is difficult to perform complete separation and identification of the peaks derived from the irregular bonds and also the amount of the irregular bonds is small, the ethylene content of the invention is determined using the relational expressions of the above (1) to (7) as in the case of the analysis of the copolymers produced with the Ziegler-Natta catalyst, which do not substantially contain the irregular bonds.

Conversion of % by mol into % by mass of the ethylene content is performed using the following expression.

Ethylene content (% by mass)=(28×X/100)/{28×X/ 100+42×(1−X/100)}×100 where X is an ethylene content in terms of % by mol.

In the invention, in the case where a low-melting-point polymer excellent in transparency and low-temperature heat-sealing properties, specifically a propylene-based polymer having a melting point of 105° C. or higher and 140° C. or lower is produced, the effect is particularly remarkably exhibited. This is because such a low-melting-point polymer has a low melting point and is easily melted. In the case where such a polymer is produced, the metallocene catalyst exhibiting a narrow compositional distribution is preferably used.

EXAMPLES

The following will explain the invention further specifically with reference to Examples and Comparative Examples. By data of individual Examples and comparison between individual Examples and individual Comparative Examples, rationality and significance of the constitution of the invention and superiority thereof to conventional art will be verified. The following will show measurement methods of individual physical properties in the invention.

The following catalyst synthetic step and polymerization step were all carried out under a purified nitrogen atmosphere. Moreover, as a solvent, one dehydrated with molecular sieve MS-4A was used.

Examples 1-1 to 1-4 and Comparative Examples 1-1 to 1-2

1. Measurement Method of Physical Properties (1) Amount of entrainment: The amount of entrainment was evaluated using a ratio of an amount of fine powder removed by a bag filter placed before a condenser per unit time to a production rate (an amount of production per unit time) [g/kg].
(2) Amount of powder of <210 μm: A powdery polymer product was sieved through a sieve of 210 μm and a ratio of powder passing through the sieve was shown as % by weight.
(3) Amount of powder of >4,750 μm: A powdery polymer product was sieved through a sieve of 4,750 μm and a ratio of powder not passing through the sieve was shown as % by weight.
(4) Melt flow rate (MFR): It was measured under conditions of 230° C. and a load of 2.16 kgf in accordance with JIS K6758.
(5) Ethylene content: It was measured in accordance with the method described in Macromolecules 1982 1150 using 13C-NMR and was shown as % by weight.

2. Examples and Comparative Examples

Example 1-1

(1) Preparation of Solid Catalyst Component

A 10 L-volume autoclave fitted with a stirring apparatus was subjected to thorough nitrogen substitution and 2 L of purified toluene was introduced thereinto. Thereto were added 200 g of Mg(OEt)$_2$ and 1 L of TiCl$_4$ at room temperature. After temperature was elevated to 90° C., 50 ml of di-n-butyl phthalate was introduced. Thereafter, the temperature was elevated to 110° C. and a reaction was carried out for 3 hrs. The reaction product was thoroughly washed with purified toluene. Then, purified toluene was introduced to adjust an amount of the total liquid to 2 L. At room temperature, 1 L of TiCl$_4$ was added and a reaction was carried out for 2 hrs after the temperature was elevated to 110° C. The reaction product was thoroughly washed with purified toluene. Furthermore, using purified n-heptane, toluene was replaced by n-heptane to obtain a slurry of a sold component. A part of the slurry was sampled and dried. When analyzed, Ti content of the solid component was 2.7 wt %. Moreover, an average particle diameter of the solid component was 33 μm.

Then, a 20 L-volume autoclave fitted with a stirring apparatus was subjected to thorough nitrogen substitution and the above slurry of the solid component was introduced in an amount of 100 g as the solid component. Purified n-heptane was introduced to adjust concentration of the solid component so as to be 25 g/L. Thereto were added 30 ml of dimethyldivinylsilane, 30 ml of (i-Pr)$_2$Si(OMe)$_2$, and an n-heptane-diluted solution of Et$_3$Al in an amount of 80 g as Et$_3$Al, and a reaction was carried out at 40° C. for 2 hrs to obtain a solid catalyst component (A1). The reaction product was thoroughly washed with purified n-heptane and a part of the resulting slurry was sampled and dried. When analyzed, the solid catalyst component (A1) contained 2.3 wt % of Ti and 7.8 wt % of (i-Pr)$_2$Si(OMe)$_2$. Moreover, an average particle diameter of (A1) was 33 μm.

(2) Pre-Polymerization

Using the solid catalyst component (A1) obtained in the above, pre-polymerization was carried out by the following procedure. A 20 L-volume autoclave fitted with a stirring apparatus was subjected to thorough nitrogen substitution, and purified n-heptane was introduced into the above slurry to adjust concentration of the solid catalyst component (A1) to 20 g/L. After the slurry was cooled to 10° C., an n-heptane-diluted solution of Et$_3$Al was added in an amount of 10 g as Et$_3$Al and 280 g of propylene was fed over the period of 4 hrs. After the feed of propylene was finished, a reaction was continued for another 30 minutes. Then, the vapor phase part was subjected to thorough nitrogen substitution and the reaction product was sufficiently washed with purified n-heptane. The resulting slurry was extracted from the autoclave and dried under vacuum to obtain a catalyst (A). The catalyst (A) contained 2.5 g of polypropylene per g of the catalyst. When analyzed, a residue of the catalyst (A) excluding polypropylene contained 1.9 wt % of Ti and 7.2 wt % of (i-Pr)$_2$Si(OMe)$_2$. Moreover, an average particle diameter of the catalyst (A) after pre-polymerization was 62 μm.

(3) Polymerization of Propylene

The polymerization is explained with reference to a flow sheet shown in FIG. 1. Using one horizontal polymerization reactor, a propylene-ethylene random copolymer was produced by vapor-phase polymerization. The horizontal polymerization reactor 10 is a continuous horizontal polymerization reactor (length/diameter=about 3.7) equipped with a stirrer, which had an inner diameter D of 340 mm, a length of 1,260 mm, a diameter of a rotation axis of 90 mm, and an inner volume of 110 L.

Here, the position of the sign 12 (barrier wall 10a) described in FIG. 1 is taken as an upstream end of the reactor.

After the inside of the horizontal polymerization reactor 10 was substituted with nitrogen, 25 kg of polypropylene powder from which polymer particles of 500 μm or less had been removed was introduced and the catalyst (A) obtained in the above was continuously fed in an amount of 0.17 g/h as a solid component from a catalyst component-feeding pipe 1 placed in a position of 160 mm from the upstream end and a 15% by weight n-hexane solution of triethylaluminum was continuously fed in a rate of 15 mmol/hr from a pipe 2 placed in a position of 150 mm from the upstream end. Moreover, propylene was fed so that ratios of hydrogen concentration and ethylene concentration to propylene concentration in the horizontal polymerization reactor 10 were maintained at 0.04 and 0.03, respectively, individual temperatures, when differential thermometers had been placed at a distance of 200, 600, 1,000 mm from the upstream end and the area was controlled with dividing into three sections, were maintained at 64, 67, and 70° C., respectively, and pressure in the horizontal polymerization reactor 10 was maintained at 2.3 MPa. Also, hydrogen and an ethylene monomer were continuously fed from a raw-material-feeding pipe 4 through a raw-material mix gas-feeding pipe 18. Dew point of the mix gas in the reactor at this time was 51° C. Temperature of the area including the catalyst feed part was 64° C. Heat of polymerization was removed by heat of vaporization of the raw-material propylene fed from a raw-material liquefied propylene-feeding pipe 19. An unreacted gas discharged from the horizontal polymerization reactor 10 was extracted through an unreacted gas-extracting pipe 13 to the outside of the reactor, cooled and condensed, and then recycled to the horizontal polymerization reactor 10 through the raw-material liquefied propylene-feeding pipe 19. Incidentally, fine powder was collected from gases by a bag filter 24 placed before a condenser 15 and an amount of entrainment was measured.

A polymer powder was continuously extracted from the horizontal polymerization reactor 10 through a polymer-extracting pipe 23 so that a retaining level of the propylene-ethylene random copolymer formed in the horizontal polymerization reactor 10 becomes 50% by volume of the reaction volume. Gases were separated from the extracted powder by means of a gas-recovering machine 22 and a powder part was extracted into a powder-recovering machine 21.

An amount of production of the propylene-ethylene random copolymer per unit time was 13.3 kg/hr and an average residence time in the horizontal polymerization reactor 10 was 1.9 hrs. Moreover, when an amount of entrainment was measured five times, the amount was 0.031 g/kg on average.

The powder recovered in the powder-recovering machine 21 had an average particle diameter of 1,540 μm and content of a fine powdery polymer of less than 210 μm was 0.10 wt % and content of an aggregated polymer of >4,750 μm was 0.02 wt %.

Example 1-2

Example 1-2 was performed in the same manner as Example 1-1 except that the temperatures of individual area sections were maintained at 70, 72, and 75° C. from the upstream.

An amount of production of the propylene-ethylene random copolymer per unit time was 12.6 kg/hr and an average residence time in the horizontal polymerization reactor 10 was 2.0 hrs. Moreover, when an amount of entrainment was measured five times, the amount was 0.035 g/kg on average.

The powder recovered in the powder-recovering machine 21 had an average particle diameter of 1,520 μm and content of a fine powdery polymer of less than 210 μm was 0.15 wt % and content of an aggregated polymer of >4,750 μm was 0.25 wt %. Analytic results of the obtained powder are shown in Table 3.

Example 1-3

In Example 1-3, use was made of a continuous horizontal polymerization reactor (length/diameter=about 5.2) equipped with a stirrer, which had an inner diameter D of 300 mm, a length of 1,550 mm, a diameter of a rotation axis of 90 mm, and an inner volume of 110 L, and a catalyst-feeding pipe at an upper part of the reactor at a distance of 160 mm from the upstream end. The Example was performed in the same manner as Example 1-1 except that differential thermometers had been placed at a distance of 300, 500, 850, 1,000, and 1,200 mm from the upstream end with dividing the area into five sections and individual temperatures were controlled to 64, 65, 67, 68, and 70° C., respectively, from the upstream.

An amount of production of the propylene-ethylene random copolymer per unit time was 13.0 kg/hr and an average residence time in the reactor was 1.9 hrs. Moreover, when an amount of entrainment was measured five times, the amount was 0.030 g/kg on average.

The recovered powder had an average particle diameter of 1,530 μM and content of a fine powdery polymer of less than 210 μm was 0.10 wt % and content of an aggregated polymer of >4,750 μm was 0.03 wt %.

Example 1-4

(1) Production of Catalyst

Chemical treatment of silicate salt: To a 10 L glass-made separable flask fitted with a stirring blade were gradually added 3.75 L of distilled water and subsequently 2.5 kg of conc. sulfuric acid (96%). Furthermore, 1 kg of montmorillonite (Benclay SL manufactured by Mizusawa Industrial Chemicals Ltd.; average particle diameter=50 μm) was dispersed, temperature was elevated to 90° C., and the temperature was maintained for 6.5 hours. After cooling to 50° C., the slurry was filtrated under reduced pressure to recover a cake. After 7 L of distilled water was added to the cake to form a slurry again, filtration was performed. The washing operation was performed until pH of washing liquid (filtrate) exceeded 3.5. The recovered cake was dried overnight at 110° C. under a nitrogen atmosphere. Mass after drying was 707 g. The chemically treated silicate salt was dried in a kiln dryer.
Preparation of catalyst: Into a 3 L-inner volume glass-made reactor fitted with a stirring blade was introduced 200 g of the dried silicate salt obtained in the above, and then 1,160 ml of mixed heptane and further 840 ml of a heptane solution (0.60M) of triethylaluminum were added thereto, followed by stirring at room temperature. After 1 hour, washing with mixed heptane was performed and a silicate salt slurry was prepared into 2.0 L. Then, 9.6 ml of a heptane solution (0.71M/L) of triisobutylaluminum was added to the prepared silicate salt slurry and a reaction was carried out at 25° C. for 1 hour. In parallel, 33.1 ml of a heptane solution (0.71M) of triisobutylaluminum was added to 2,180 mg (3 mmol) of [(r)-dichloro[1,1'-dimethylsilylenebis{2-methyl-4-(4-chlorophenyl)-4H-azulenyl}]zirconium] (synthesis was performed according to Examples of JP-A-10-226712) and 870 ml of mixed heptane, and a reaction was carried out at room temperature for 1 hour to obtain a mixture. The mixture was added to the silicate salt slurry, followed by stirring for 1 hour. Thus, a catalyst component (B1) of silicate salt/metallocene complex slurry was obtained.

(2) Pre-Polymerization

Subsequently, 2.1 L of n-heptane was introduced into a 10 L-inner volume stirring-type autoclave subjected to thorough nitrogen substitution and the whole was kept at 40° C. The silicate salt/metallocene complex slurry that was the previously prepared catalyst component (B1) was introduced thereinto. When temperature became stable at 40° C., propylene was fed at a rate of 100 g/hour to maintain the temperature. After 4 hours, the feed of propylene was stopped and the whole was maintained for another 2 hours. After completion of the pre-polymerization, remaining monomer was purged and stirring was stopped. After standing for about 10 minutes, about 3 L of supernatant was decanted. Then, 9.5 ml of a heptane solution of triisobutylaluminum (0.71M/L) and further 5.6 L of mixed heptane were added, followed by stirring at 40° C. for 30 minutes and, after standing for 10 minutes, 5.6 L of supernatant was removed. Furthermore, the operation was repeated three times. When final supernatant was subjected to component analysis, concentration of organoaluminum component was 1.23 mmol/L, Zr concentration was $8.6 \times 10^{-6}$ g/L, and a ratio of an amount present in the supernatant to the charged amount was 0.016%. Subsequently, 17.0 ml of a heptane solution of triisobutylaluminum (0.71M/L) was added and then drying under reduced pressure was performed at 45° C. By this operation, a pre-polymerization catalyst (B) containing 2.2 g of polypropylene per g of the catalyst was obtained.

(3) Polymerization of Propylene

Using the horizontal polymerization reactor used in Example 1-1, vapor-phase polymerization was carried out. After the inside of the horizontal polymerization reactor 10 was substituted with nitrogen, 35 kg of polypropylene powder from which polymer particles of 500 μm or less had been removed was introduced. Thereafter, temperature was elevated while propylene and ethylene and hydrogen were introduced and, at the time when polymerization conditions were ready, a hexane slurry of the above catalyst subjected to the pre-polymerization treatment was fed from the catalyst component-feeding pipe 1 in a rate of 0.74 g/hr as the catalyst component containing no pre-polymerization polymer and triisobutylaluminum as an organoaluminum compound was fed from the pipe 2 in a rate of 15 mmol/hr.

The area was controlled with dividing into three sections and ethylene gas and hydrogen gas were fed from the raw-material-feeding pipe 4 so that individual temperatures were maintained at 55, 56, and 60° C. from the upstream, respectively, pressure in the reactor 10 was maintained at 2.3 MPa, and mix gas molar ratio of ethylene/propylene in the vapor phase of the reactor was maintained at 0.08 and a molar ratio of hydrogen/propylene was maintained at 0.0003. Dew point in the reactor at this time was 50° C. A polymer was continuously extracted from the horizontal polymerization reactor 10 through the polymer-extracting pipe 23 so that a retaining level of the propylene-ethylene random copolymer formed in the reactor 10 becomes 65% by volume of the reaction volume. Gases were separated from the extracted powder by means of the gas-recovering machine 22 and a Powder part was extracted into the powder-recovering machine 21.

An amount of production of the propylene-ethylene random copolymer per unit time was 13.0 kg/hr and an average residence time in the reactor 10 was 1.9 hrs. Moreover, when an amount of entrainment was measured five times, the amount was 0.090 g/kg on average.

The recovered powder had an average particle diameter of 1,310 μm and content of a fine powdery polymer of less than 210 μm was 0.10 wt % and content of an aggregated polymer of >4,750 μm was 0.05 wt %. Analytical results of the obtained powder are shown in Table 3.

Comparative Example 1-1

This Comparative Example was performed in the same manner as Example 1-1 except that the temperatures of individual area sections were maintained at 75, 75, and 75° C. from the upstream. Results are shown in Table 3.

Comparative Example 1-2

This Comparative Example was performed in the same manner as Example 1-4 except that the temperatures of individual area sections were maintained at 60, 60, and 60° C. from the upstream. Results are shown in Table 3.

TABLE 3

|  |  | Example 1-1 | Example 1-2 | Example 1-3 | Example 1-4 | Comparative Example 1-1 | Comparative Example 1-2 |
|---|---|---|---|---|---|---|---|
|  |  |  |  | Catalyst |  |  |  |
|  |  | ZN | ZN | ZN | Met | ZN | Met |
| Polymerization conditions |  |  |  |  |  |  |  |
| Pressure | MPa | 2.3 | 2.3 | 2.3 | 2.3 | 2.3 | 2.3 |
| Temperature 1 | ° C. | 64 | 70 | 64 | 55 | 75 | 60 |
| Temperature 2 | ° C. | 67 | 72 | 65 | 56 | 75 | 60 |
| Temperature 3 | ° C. | 70 | 75 | 67 | 60 | 75 | 60 |
| Temperature 4 | ° C. | — | — | 68 | — | — | — |
| Temperature 5 | ° C. | — | — | 70 | — | — | — |
| ΔT1(downstream-upstream) | ° C. | 6 | 5 | 6 | 5 | 0 | 0 |
| Hydrogen/propylene | molar ratio | 0.04 | 0.04 | 0.04 | 0.0003 | 0.04 | 0.0003 |
| Ethylene/propylene | molar ratio | 0.03 | 0.03 | 0.03 | 0.08 | 0.03 | 0.08 |
| Dew point | ° C. | 51 | 51 | 51 | 50 | 51 | 50 |
| ΔT2 (catalyst feed zone-dew point) | ° C. | 13 | 19 | 13 | 5 | 24 | 10 |
| Average residence time | hr | 1.9 | 2.0 | 1.9 | 1.9 | 2.0 | 2.6 |
| Production rate | kg/h | 13.3 | 12.6 | 13.0 | 13.0 | 12.3 | 9.8 |
| Activity | g-PP/g-catalyst | 78000 | 74000 | 76500 | 18000 | 70000 | 13000 |
| Propylene-based random copolymer |  |  |  |  |  |  |  |
| MFR | g/10 min | 30 | 30 | 30 | 10 | 30 | 10 |
| Ethylene content | % by weight | 0.3 | 0.3 | 0.3 | 1.8 | 0.3 | 1.8 |
| Amount of entrainment | g/kg | 0.031 | 0.035 | 0.030 | 0.090 | 0.100 | 0.290 |
| Ratio of <210 μm in sample | % by weight | 0.10 | 0.15 | 0.10 | 0.10 | 0.32 | 0.40 |
| Ratio of >4750 μm in sample | % by weight | 0.02 | 0.25 | 0.03 | 0.05 | 0.90 | 4.10 |

Consideration on Results of Examples and Comparative Examples

As is apparent from Table 3, as compared with Comparative Examples 1-1 to 1-2, in Examples 1-1 to 1-4, the amount of generation of aggregated one and fine powder in the powder is small and also the catalytic activity is high, so that it is shown that the cases are economically useful.

In the comparison of Examples 1-1 to 1-3 with Comparative Example 1-1 using the Ziegler catalyst, production methods where the temperature difference ΔT1 (° C.) between the reaction temperature of the reactor upstream end and the temperature of the downstream end is different are compared.

As compared with Example 1-1, in Comparative Example 1-1, the ratio of >4,750 μm in the sample as an index of generation of aggregated one is high, the amount of generation of fine powder and the amount of entrainment are large, and a decrease in activity is generated, so that the case is not preferred.

In Example 1-2, the temperature difference ΔT2 (° C.)=Tx−Tz between the temperature (Tx) of an area including the catalyst feed part and the dew point (Tz) of the mix gas in the reactor is higher than in Example 1-1. As compared with Example 1-1, the ratio of >4,750 μm in the sample is high and a decrease in activity is generated but it shows that the present procedure is effective for stable production and improvement in production efficiency by the control of ΔT2 (° C.)=Tx−Tz.

In Example 1-3, more extensive temperature control is performed as compared with the case in Example 1-1 and the amount of entrainment is reduced although the degree is slight, which shows efficiency of temperature control depending on the shape of the reactor.

In Example 1-4 and Comparative Example 1-2, using metallocene catalyst, production methods where the temperature difference ΔT1 (° C.) between the reaction temperature of the reactor upstream end and the temperature of the downstream end is different are compared. As compared with Example 1-4, in Comparative Example 1-2, the generation of both of aggregated one and fine powder is considerably large and the amount of entrainment is also large, so that the case is not preferred in view of stable operation (process operation). Moreover, a decrease in activity also occurs, so that the case is economically disadvantageous.

From the above results, in Examples, as compared with Comparative Examples, there are obtained such excellent results that the generation of aggregated one and fine powder is inhibited, the amount of entrainment is small, and the catalytic activity is high by effectively controlling the temperature in the horizontal polymerization reactor equipped with stirring vanes rotating around a horizontal axis, so that it is said that rationality and significance of the constitution of the invention and superiority thereof to conventional art are demonstrated.

Examples 2-1 to 2-5 and Comparative Examples 2-1 to 2-2

1. Measurement Method of Physical Properties and Apparatus (1) MFR

For the polypropylene-based polymers, melt index values measured in accordance with JIS-K-6758 are shown.

(2) Ethylene Content in Polymer

It was measured according to the method "Measurement of ethylene content by NMR" mentioned above.

(3) Melting Point (Tm) of Polymer

A peak temperature was taken as a melting point (Tm) at the time when a sample was heated from room temperature to 230° C. under a condition of 80° C./minute, maintained at the temperature for 10 minutes, then cooled to 50° C. at a rate of −10° C./minute, maintained at the temperature for 3 minutes, and then melted under a heating condition of 10° C./minute using a DSC7 model differential scanning calorimeter manufactured by Perkin-Elmer Corporation.

2. Examples and Comparative Examples

Example 2-1

(1) Production of Pre-Polymerization Catalyst

Chemical treatment of silicate salt: To a 10 L glass-made separable flask fitted with a stirring blade were gradually added 3.75 L of distilled water and subsequently 2.5 kg of conc. sulfuric acid (96%). At 50° C., 1 kg of montmorillonite (Benclay SL manufactured by Mizusawa Industrial Chemicals Ltd.; average particle diameter=50 μm) was further dispersed, temperature was elevated to 90° C., and the temperature was maintained for 6.5 hours. After cooling to 50° C., the slurry was filtrated under reduced pressure to recover a cake. After 7 L of distilled water was added to the cake to form a slurry again, filtration was performed. The washing operation was performed until pH of washing liquid (filtrate) exceeded 3.5. The recovered cake was dried overnight at 110° C. under a nitrogen atmosphere. Mass after drying was 710 g. The chemically treated silicate salt was dried in a kiln dryer.

Preparation of catalyst: Into a 3 L-inner volume glass-made reactor fitted with a stirring blade was introduced 100 g of the dried silicate salt obtained in the above, and then 580 ml of mixed heptane and further 420 ml of a heptane solution (0.60M) of triethylaluminum were added thereto, followed by stirring at room temperature. After 1 hour, washing with mixed heptane was performed and a silicate salt slurry was prepared into 2.0 L. Then, 4.8 ml of a heptane solution (0.71M/L) of triisobutylaluminum was added to the prepared silicate salt slurry and a reaction was carried out at 25° C. for 1 hour. In parallel, 16.5 ml of a heptane solution (0.71M) of triisobutylaluminum was added to 1,090 mg (1.5 mmol) of [(r)-dichloro[1,1-dimethylsilylenebis{2-methyl-4-(4-chlorophenyl)-4H-azulenyl}]zirconium] (synthesis was performed according to Examples of JP-A-10-226712) and 870 ml of mixed heptane and a reaction was carried out at room temperature for 1 hour to obtain a mixture. The mixture was added to the silicate salt slurry, followed by stirring for 1 hour.

(2) Pre-Polymerization

Subsequently, 2.1 L of normal heptane was introduced into a 10 L-inner volume stirring-type autoclave subjected to thorough nitrogen substitution and the whole was kept at 40° C. The silicate salt/metallocene complex slurry previously prepared was introduced thereinto. When temperature became stable at 40° C., propylene was fed at a rate of 100 g/hour to maintain the temperature. After 2 hours, the feed of propylene was stopped and the whole was maintained for another 2 hours. After completion of the pre-polymerization, remaining monomer was purged and stirring was stopped. After standing for about 10 minutes, about 3 L of supernatant was decanted. Then, 4.7 ml of a normal heptane solution of tri-isobutylaluminum (0.71M/L) and further 2.8 L of normal heptane were added, followed by stirring at 40° C. for 30 minutes and, after standing for 10 minutes, 2.8 L of supernatant was removed. Furthermore, the operation was repeated three times. Subsequently, 8.5 ml of a normal heptane solution of triisobutylaluminum (0.71M/L) was added and then drying under reduced pressure was performed at 45° C. By this operation, a pre-polymerization catalyst containing 2.1 g of polypropylene per g of the catalyst was obtained.

Furthermore, normal hexane was added to the obtained pre-polymerization catalyst to prepare a 0.8 g/L catalyst slurry as a catalyst component containing no pre-polymerization polymer.

(3) Polymerization of Propylene

The polymerization is explained with reference to a flow sheet shown in FIG. 1. Using one horizontal polymerization reactor, vapor-phase polymerization was carried out. The horizontal polymerization reactor 10 is a continuous horizontal polymerization reactor (length/diameter=about 3.7) equipped with a stirrer, which had an inner diameter D of 340 mm, a length of 1,260 mm, a diameter of a rotation axis of 90 mm, and an inner volume of 110 L.

Here, the position of the sign 12 (barrier wall 10a) described in FIG. 1 is taken as an upstream end of the reactor.

After the inside of the horizontal polymerization reactor 10 was substituted with nitrogen, 35 kg of seeds polypropylene powder was introduced and nitrogen gas was allowed to flow for 3 hours. Thereafter, temperature was elevated while propylene, ethylene and hydrogen were introduced and, at the time when polymerization conditions were ready, the pre-polymerization catalyst obtained in the above was fed in a rate of 1.2 g/hr as a solid component from a catalyst component-feeding pipe 1 placed in a position of 160 mm from the upstream end and a 15% by weight n-hexane solution of triethylaluminum was continuously fed in a rate of 15 mmol/hr from a catalyst component-feeding pipe 2 placed in a position of 150 mm from the upstream end. Moreover, propylene was fed so that ratios of hydrogen concentration and ethylene concentration to propylene concentration in the reactor 10 were maintained at 0.00035 and 0.06, respectively, individual temperatures, when differential thermometers had been placed at a distance of 200, 600, 1,000 mm from the upstream end and the area was controlled with dividing into three sections, were maintained at 53, 56, and 59° C., respectively, and pressure in the horizontal polymerization reactor 10 was maintained at 2.20 MPa. Also, hydrogen and an ethylene monomer were continuously fed from a raw-material-feeding pipe 4 through a raw material-feeding pipe 4. Dew point (Tx) in the reactor at this time was 50° C. and the temperature difference ΔT2 between the temperature (Tz) at the catalyst feed part and the dew point (Tx) of the mix gas in the reactor was 3° C. Heat of polymerization was removed by heat of vaporization of the raw-material propylene fed from a raw-material liquefied propylene-feeding pipe 19. An unreacted gas discharged from the horizontal polymerization reactor 10 was extracted through an unreacted gas-extracting pipe 13 to the outside of the reactor, cooled and condensed, and then recycled to the horizontal polymerization reactor 10 through the raw-material liquefied propylene-feeding pipe 19.

A polymer powder was continuously extracted from the horizontal polymerization reactor 10 through a polymer-extracting pipe 23 so that a retaining level of the propylene-ethylene random copolymer formed in the horizontal polymerization reactor 10 became 60% by volume of the reaction volume. Gases were separated from the extracted powder by means of a gas-recovering machine 22 and a powder part was extracted into a powder-recovering machine 21.

An amount of production of the propylene-ethylene random copolymer per unit time was 7.0 kg/hr and catalyst efficiency was 18,100 g-PP/g-Cat.

(4) Amount of Aggregated Polymer

A polymer product was sieved through a sieve of 4,750 μm and % by weight of powder not passing through the sieve was taken.

Measurement results of MFR, ethylene content, and Tm of the obtained propylene-ethylene random copolymer are collectively shown in Table 4.

The above operation was performed for 72 hours and it was confirmed that no problem was present on stability of operation. As a result of measurement of an amount of lumps contained in the polymer extracted from the horizontal polymerization reactor 10 every 4 hour during the operation by sieving through a sieve of 4,750 microns opening, the amount of lumps was zero at every time. Moreover, the amount of lumps in the remaining polymer in the reactor after the reaction was finished was also zero.

Comparative Example 2-1

A propylene-ethylene random copolymer was produced in the same manner as in Example 2-1 except that the feed amount of the pre-polymerization catalyst was 1.5 g/h as a solid composition and the polymerization temperatures in the horizontal polymerization reactor 10 were all 60° C. At this time, the dew point (Tx) in the reactor was 50° C. and the temperature difference $\Delta T2$ between the temperature (Tz) at the catalyst feed part and the dew point (Tx) of the mix gas in the reactor was 10° C. The catalyst efficiency was 14,500 g-PP/g-Cat. Analytical results of the obtained powder are collectively shown in Table 4.

Moreover, as a result of measurement of an amount of lumps contained in the polymer extracted from the horizontal polymerization reactor 10 every 4 hour by sieving through a sieve of 4,750 microns opening, the amount of lumps was 0.8% by weight on average. Furthermore, the amount of lumps in the remaining polymer in the reactor after the reaction was finished was 5.5% by weight.

Example 2-2

A propylene-ethylene random copolymer was produced in the same manner as in Example 2-1 except that the feed amount of the pre-polymerization catalyst was 1.7 g/h as a solid composition, the concentration ratio of hydrogen to propylene was 0.00023, and the polymerization temperatures in the reactor 10 were 51, 55, and 59° C. from the upstream. At this time, the dew point (Tx) in the reactor was 50° C. and the temperature difference $\Delta T2$ between the temperature (Tz) at the catalyst feed part and the dew point (Tx) of the mix gas in the reactor was 1° C. The catalyst efficiency was 12,800 g-PP/g-Cat. Analytical results of the obtained powder are collectively shown in Table 4.

Moreover, as a result of measurement of an amount of lumps contained in the polymer extracted from the horizontal polymerization reactor 10 every 4 hour by sieving through a sieve of 4,750 microns opening, the amount of lumps was zero at every time. Furthermore, the amount of lumps in the remaining polymer in the reactor after the reaction was finished was also zero.

Example 2-3

A propylene-ethylene random copolymer was produced in the same manner as in Example 2-2 except that the feed amount of the pre-polymerization catalyst was 2.5 g/h as a solid composition and the polymerization temperatures in the horizontal polymerization reactor 10 were all 53° C. At this time, the dew point (Tx) in the reactor was 50° C. and the temperature difference $\Delta T2$ between the temperature (Tz) at the catalyst feed part and the dew point (Tx) of the mix gas in the reactor was 3° C. The catalyst efficiency was 8,700 g-PP/g-Cat. Analytical results of the obtained powder are collectively shown in Table 4.

Moreover, as a result of measurement of an amount of lumps contained in the polymer extracted from the horizontal polymerization reactor 10 every 4 hour by sieving through a sieve of 4,750 microns opening, the amount of lumps was zero at every time. Furthermore, the amount of lumps in the remaining polymer in the reactor after the reaction was finished was also zero.

Example 2-4

A propylene-ethylene random copolymer was produced in the same manner as in Example 2-1 except that the feed amount of the pre-polymerization catalyst was 1.1 g/h as a solid composition, the concentration ratio of hydrogen to propylene was 0.00009, the concentration ratio of ethylene to propylene was 0.10, and the polymerization temperatures in the horizontal polymerization reactor 10 were 51, 55, and 59° C. from the upstream. At this time, the dew point (Tx) in the reactor was 48° C. and temperature difference $\Delta T2$ between the temperature (Tz) at the catalyst feed part and the dew point (Tx) of the mix gas in the reactor was 3° C. The catalyst efficiency was 19,700 g-PP/g-Cat. Analytical results of the obtained powder are collectively shown in Table 4.

Moreover, as a result of measurement of an amount of lumps contained in the polymer extracted from the horizontal polymerization reactor 10 every 4 hour by sieving through a sieve of 4,750 microns opening, the amount of lumps was zero at every time. Furthermore, the amount of lumps in the remaining polymer in the reactor after the reaction was finished was also zero.

Comparative Example 2-2

A propylene-ethylene random copolymer was produced in the same manner as in Example 2-4 except that the feed amount of the pre-polymerization catalyst was 1.4 g/h as a solid composition and the polymerization temperatures in the horizontal polymerization reactor 10 were all 55° C. At this time, the dew point (Tx) in the reactor was 48° C. and the temperature difference $\Delta T2$ between the temperature (Tz) at the catalyst feed zone and the dew point (Tx) of the mix gas in the reactor was 7° C. The catalyst efficiency was 13,500 g-PP/g-Cat. Analytical results of the obtained powder are collectively shown in Table 4. Moreover, as a result of measurement of an amount of lumps contained in the polymer extracted from the horizontal polymerization reactor 10 every 4 hour by sieving through a sieve of 4,750 microns opening, the amount of lumps was 1.1% by weight on average. Furthermore, the amount of lumps in the remaining polymer in the reactor after the reaction was finished was 7.8% by weight.

Example 2-5

A propylene-ethylene random copolymer was produced in the same manner as in Example 2-1 except that the feed amount of the pre-polymerization catalyst was 0.6 g/h as a solid composition, the concentration ratio of hydrogen to propylene was 0.0009, the concentration ratio of ethylene to propylene was 0.26, and the polymerization temperatures in the horizontal polymerization reactor 10 were 47, 50, and 55° C. from the upstream. At this time, the dew point (Tx) in the reactor was 45° C. and the temperature difference $\Delta T2$ between the temperature (Tz) at the catalyst feed part and the dew point (Tx) of the mix gas in the reactor was 2° C. The catalyst efficiency was 36,200 g-PP/g-Cat. Analytical results of the obtained powder are collectively shown in Table 4.

Moreover, as a result of measurement of an amount of lumps contained in the polymer extracted from the horizontal polymerization reactor 10 every 4 hour by sieving through a sieve of 4,750 microns opening, the amount of lumps was zero at every time. Furthermore, the amount of lumps in the remaining polymer in the reactor after the reaction was finished was also zero.

Japanese Patent Application No. 2009-296556 filed on Dec. 27, 2009, and Japanese Patent Application No. 2009-299307 filed on Dec. 31, 2009, and the contents are incorporated herein by reference.

DESCRIPTION OF REFERENCE NUMERALS AND SIGNS 1,2 Catalyst component-feeding pipe
3 Raw-material propylene-feeding pipe

TABLE 4

|  | Example 2-1 | Comparative Example 2-1 | Example 2-2 | Example 2-3 | Example 2-4 | Comparative Example 2-2 | Example 2-5 |
|---|---|---|---|---|---|---|---|
| <Polymerization step> | | | | | | | |
| Polymerization pressure (MPaG) | 2.2 | 2.2 | 2.2 | 2.2 | 2.2 | 2.2 | 2.2 |
| Polymerization temperature Upstream part (Tα) (° C.) | 53 | 60 | 51 | 53 | 51 | 55 | 47 |
| Middle part (° C.) | 56 | 60 | 55 | 53 | 55 | 55 | 50 |
| Downstream part (Tω) (° C.) | 59 | 60 | 59 | 53 | 59 | 55 | 55 |
| ΔT1 | 6 | 0 | 8 | 0 | 8 | 0 | 8 |
| Ethylene/propylene (molar ratio) | 0.06 | 0.06 | 0.06 | 0.06 | 0.10 | 0.10 | 0.26 |
| Hydrogen/propylene (molar ratio) | 0.00035 | 0.00035 | 0.00023 | 0.00023 | 0.00009 | 0.00009 | 0.00091 |
| Dew point (° C.) | 50 | 50 | 50 | 50 | 48 | 48 | 45 |
| ΔT2 (° C.) | 3 | 10 | 1 | 3 | 3 | 7 | 2 |
| <Powder analytical values> | | | | | | | |
| MFR (g/10 minutes) | 25 | 25 | 10 | 10 | 2 | 2 | 7 |
| Ethylene content (% by weight) | 1.8 | 1.8 | 1.8 | 1.8 | 3.0 | 3.0 | 5.9 |
| Tm (° C.) | 133 | 133 | 133 | 133 | 122 | 122 | 107 |
| Catalyst efficiency (g-PP/g-Cat) | 18000 | 15000 | 13000 | 8000 | 19000 | 13000 | 40000 |
| <Operation stability> | | | | | | | |
| Amount of lumps in operation sample (% by weight) | 0 | 0.8 | 0 | 0 | 0 | 1.1 | 0 |
| Amount of lumps in remaining sample in reactor (% by weight) | 0 | 5.5 | 0 | 0 | 0 | 7.8 | 0 |

3. Evaluation

In the comparison of Example 2-1 with Comparative Example 2-1 and of Example 2-4 with Comparative Example 2-2, it is shown that no lump is formed and stable operation can be maintained when ΔT2 falls within the range of the present application.

In the comparison of Example 2-2 with Example 2-3, it is shown that the catalyst efficiency is increased and more highly active conditions are achieved by elevating the temperatures at the middle part and the downstream part.

Example 2-5 shows that, even in the case of low Tm, no lump is formed and stable operation is possible when ΔT2 falls within the range of the present application.

From the above results, in Examples, as compared with Comparative Examples, there are obtained such excellent results that the generation of the aggregate polymer is inhibited, production efficiency is also high, and further a low-melting-point polymer is obtained and is rich in heat-sealing properties by effectively controlling the temperature in the horizontal polymerization reactor equipped with stirring vanes rotating around a horizontal axis, so that it can be said that rationality and significance of the constitution of the invention and superiority thereof to conventional art are demonstrated.

While the invention has been described in detail and with reference to specific embodiments thereof, it will be apparent to one skilled in the art that various changes and modifications can be made therein without departing from the spirit and scope thereof. The present application is based on Japanese Patent Application No. 2009-249568 filed on Oct. 29, 2009, 4 Raw material-feeding pipe (hydrogen etc.)
10 Horizontal polymerization reactor
10a, 10b Barrier wall
11 Vapor-liquid separation tank
12 Reactor upstream end
13 Unreacted gas-extracting pipe
14 Reactor downstream end
15 Condenser
16 Compressor
17 Pump
18 Raw-material mix gas-feeding pipe
19 Raw-material liquefied propylene-feeding pipe
20 Stirrer
20a Horizontal axis
20b Stirring vane
21 Powder-recovering machine
22 Gas-recovering machine
23 Polymer-extracting pipe
24 Bag filter
25 Horizontal polymerization reactor
31a, 31b Barrier wall
32 Reactor upstream end
33 Reactor downstream end
34 Catalyst component-feeding pipe
35 Polymer-extracting pipe
36 Differential thermometer
37 Raw-material liquefied propylene-feeding pipe
38 Operating valve
39 Raw-material mix gas-feeding pipe
40 Operating valve

The invention claimed is:

1. A method for producing a propylene-based polymer, the method comprising:

polymerizing propylene or propylene and an α-olefin, which is not propylene, in the presence of a catalyst with a horizontal polymerization reactor comprising stirring vanes rotating around a horizontal axis inside the reactor by a continuous vapor-phase polymerization, which removes heat of polymerization by heat of vaporization of a liquefied propylene, wherein the catalyst is a metallocene compound, and wherein the reactor can set a plurality of area sections different in temperature in a horizontal axis direction inside the reactor and satisfies at least one selected from the group consisting of:

(C) a temperature difference, $\Delta T1$ (° C.)=Tω−Tα, between an area section comprising an upstream end of the reactor (Tα) and of an area section comprising a downstream end thereof (Tω) is 0.1 to 20° C. and a temperature difference, $\Delta T2$ (° C.)=Tx−Tz, between an area section comprising a catalyst feed part (Tx) and dew point (Tz) of a mix gas in the reactor is 1 to 20° C.; and (D) a temperature difference, $\Delta T1$ (° C.)=Tω−Tα, between an area section comprising an upstream end of the reactor (Tα) and an area section comprising a downstream end thereof (Tω) is 2 to 15° C. and a temperature difference, $\Delta T2$ (° C.)=Tx−Tz, between an area section comprising a catalyst feed part and dew point (Tz) of a mix gas in the reactor is 0 to 5° C.

2. The method of claim 1, wherein the metallocene polymerization catalyst has a particle diameter from 1-200 μm.

3. The method of claim 1, wherein a melting peak temperature Tm of the propylene-based polymer to be produced is 105 to 140° C. on differential scanning calorimetry (DSC).

4. The method of claim 1, wherein a reaction temperature Tn of an n-th area section (n) from the upstream end to the downstream side and reaction temperature Tn+1 of an area section (n+1) adjacent to the area section (n) on the downstream side satisfies a relation:

$$Tn \leq Tn+1,$$

wherein n is an integer of 1 or more.

5. The method of claim 1, wherein a reaction temperature Tn of a plurality of the area sections (n) are different from each other.

6. The method of claim 1, wherein the area section comprising the upstream end of the reactor comprises the catalyst feed part.

7. The method of claim 1, wherein the catalyst feed part is placed in an area at a distance of 2.5 to 10% of a length of the reactor on the downstream side from the upstream end of the reactor.

8. The method of claim 1, wherein at least a half of the heat of reaction is removed with the heat of vaporization of liquefied propylene.

9. A method for producing a propylene-based polymer, the method comprising:

polymerizing propylene or propylene and an α-olefin, which is not propylene, in the presence of a catalyst with a horizontal polymerization reactor comprising stirring vanes rotating around a horizontal axis inside the reactor by a continuous vapor-phase polymerization, which removes heat of polymerization by heat of vaporization of a liquefied propylene, wherein the catalyst is a Ziegler polymerization catalyst or a metallocene polymerization catalyst, and wherein the reactor can set a plurality of area sections different in temperature in a horizontal axis direction inside the reactor and satisfies at least one selected from the group consisting of:

(C) a temperature difference, $\Delta T1$ (° C.)=Tω−Tα, between an area section comprising an upstream end of the reactor (Tα) and of an area section comprising a downstream end thereof (Tω) is 0.1 to 20° C. and a temperature difference, $\Delta T2$ (° C.)=Tx−Tz, between an area section comprising a catalyst feed part (Tx) and dew point (Tz) of a mix gas in the reactor is 1 to 20° C.; and (D) a temperature difference, $\Delta T1$ (° C.)=Tω−Tα, between an area section comprising an upstream end of the reactor (Tα) and an area section comprising a downstream end thereof (Tω) is 2 to 15° C. and a temperature difference, $\Delta T2$ (° C.)=Tx−Tz, between an area section comprising a catalyst feed part and dew point (Tz) of a mix gas in the reactor is 0 to 5° C.

10. The method of claim 9, wherein the metallocene polymerization catalyst has a particle diameter from 1-200 μm.

11. The method of claim 10, wherein a melting peak temperature Tm of the propylene-based polymer to be produced is 105 to 140° C. on differential scanning calorimetry (DSC).

* * * * *